United States Patent
Harms et al.

(10) Patent No.: US 6,493,376 B1
(45) Date of Patent: Dec. 10, 2002

(54) MULTI-LAYERED PN CODE SPREADING IN A MULTI-USER COMMUNICATIONS SYSTEM

(75) Inventors: Brian Harms, Boulder, CO (US); Brian Butler, La Jolla, CA (US); Gordon Skinner, deceased, late of Boulder, CO (US), by Margo Boodakian, executrix

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/169,358

(22) Filed: Oct. 9, 1998

Related U.S. Application Data

(60) Provisional application No. 60/061,698, filed on Oct. 10, 1997.

(51) Int. Cl.[7] .......................... H04B 15/00; H04K 1/00; H04L 27/30
(52) U.S. Cl. ...................................................... 375/130
(58) Field of Search .................................. 375/130, 140, 375/141, 142, 143, 144, 146, 147, 148, 150, 152, 367; 370/335, 342, 344, 441, 515

(56) References Cited

U.S. PATENT DOCUMENTS

| | | | |
|---|---|---|---|
| 4,969,159 A | 11/1990 | Belcher et al. | 375/22 |
| 5,103,459 A | 4/1992 | Gilhousen et al. | |
| 5,109,390 A | 4/1992 | Gilhousen et al. | |
| 5,228,054 A | 7/1993 | Rueth et al. | |
| 5,506,865 A | 4/1996 | Weaver, Jr. | |
| 5,577,025 A | 11/1996 | Skinner et al. | |
| 5,644,591 A | 7/1997 | Sutton | |
| 5,691,974 A | 11/1997 | Zehavi | |
| 5,790,588 A | * 8/1998 | Fukawa et al. | 375/146 |
| 6,128,332 A | * 10/2000 | Fukawa et al. | 375/146 |

FOREIGN PATENT DOCUMENTS

| | | | |
|---|---|---|---|
| EP | 0748074 | 12/1996 | H04J/13/02 |

* cited by examiner

Primary Examiner—Jean Corrielus
(74) Attorney, Agent, or Firm—Philip R. Wadsworth; Gregory D. Ogrod; Jae-Hee Choi

(57) ABSTRACT

A technique for spreading information signals in a spread spectrum communication system to provide increased signal acquisition speed. A first PN spreading code or code set is used to spread information signals along with a second PN spreading code sequence or function. The second PN code is synchronized with the first PN spreading code, but has a larger code period so that each code chip of the second PN code extends over the entire period of the first PN code. The longer period spreading code forms an outer code which helps provide unambiguous beam identification and easily acquired frame timing in the presence of dynamically changing signal path delay, improving signal acquisition.

47 Claims, 12 Drawing Sheets

MULTI-LAYERED PN CODE SPREADING IN A MULTI-USER COMMUNICATIONS SYSTEM

This application claims priority under the benefit of U.S.C Section 120 to Provisional Patent Application No. 60/061,698, filed Oct. 10, 1997, and entitled "Multi-Layered PN Code Spreading in a Multi-User Communications System", and said Provisional Application is incorporated herein by reference.

BACKGROUND OF THE INVENTION

I. Field of the Invention

The present invention relates to spread spectrum communication systems, such as wireless data or telephone systems, and satellite communication systems. More particularly, the invention relates to a method and apparatus for generating, identifying, and acquiring spread spectrum communication signals using layered or overlayed PN spreading and identifier codes having differing periods or chip rates.

II. Description of the Related Art

A variety of multiple access communication systems and techniques have been developed for transferring information among a large number of system users, such as code division multiple access (CDMA) spread spectrum techniques. CDMA techniques in multiple access communication systems are disclosed in the teachings of U.S. Pat. No. 4,901,307, which issued Feb. 13, 1990 under the title "Spread Spectrum Multiple Access Communication System Using Satellite Or Terrestrial Repeaters", and U.S. Pat. No. 5,691,974, which issued Nov. 25, 1997, under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

These patents disclose communication systems in which a large number of generally mobile or remote system users or subscribers use transceivers to communicate with other system users or desired signal recipients, such as through a connected public telephone switching network. The system users communicate through gateways and satellites, or terrestrial base stations (also referred to as cell-sites or cells) using CDMA spread spectrum communication signals.

In a typical spread-spectrum communication system, one or more sets or pairs of preselected pseudorandom noise (PN) code sequences are used to modulate or 'spread' user information signals over a predetermined spectral band prior to modulation onto a carrier for transmission as communication signals. PN spreading is a method of spread-spectrum transmission that is well known in the art, and produces a communication signal with a bandwidth much greater than that of the underlying data signal. In the base station- or gateway-to-user communication link, also referred to as the forward link, PN spreading codes or binary sequences are used to discriminate between signals transmitted by different base stations or between signals of different beams, satellites, or gateways, as well as between multipath signals.

These codes are typically shared by all communication signals within a given cell or beam, and time shifted or offset between adjacent beams or cells to create different spreading codes. The time offsets provide unique beam identifiers which are useful for beam-to-beam handoff and for determining signal timing relative to basic communication system timing.

In a typical CDMA spread-spectrum communication system, channelizing codes are used to discriminate between signals intended for different users within a cell or between user signals transmitted within a satellite beam, or sub-beam, on a forward link. That is, each user transceiver has its own orthogonal channel provided on the forward link by using a unique 'covering' or 'channelizing' orthogonal code. Walsh functions are generally used to implement the channelizing codes, with a typical length being on the order of 64 code chips for terrestrial systems and 128 code chips for satellite systems. In this arrangement, each Walsh function of 64 or 128 chips is typically referred to as a Walsh symbol.

PN code based modulation techniques used in CDMA signal processing allow spectrally similar communication signals to be quickly differentiated. This allows signals traversing different propagation paths to be readily distinguished from each other, provided path length differential causes relative propagation delays in excess of the PN code chip period. If a PN chip rate of say approximately 1.22 MHz is used, a spread spectrum communication system can distinguish or discriminate between signals or signal paths differing by more than one microsecond in path delay or time of arrival.

Wideband CDMA techniques permit problems such as multipath fading to be more readily overcome and provide a relatively high signal gain. However, some form of signal diversity is also generally provided to further reduce the deleterious effects of fading and additional problems associated with acquiring and demodulating signals in the presence of relative user and satellite or source movement within a communication system. Such movement along with large distances causes substantial dynamic changes in path lengths. Generally, three types of diversity are used in spread spectrum communication systems, including time, frequency, and space diversity. Time diversity is obtainable using error correction coding or simple repetition and time interleaving of signal components, and a form of frequency diversity is inherently provided by spreading the signal energy over a wide bandwidth. Space diversity is provided using multiple signal paths, typically, through different antennas or communication signal beams.

Typical CDMA spread spectrum communication systems contemplate the use of coherent modulation and demodulation techniques for forward link user terminal communications. In communication systems using this approach, a 'pilot' signal (or other known signal) can be used as a coherent phase reference for gateway- or satellite-to-user and base station-to-user links. That is, a pilot signal, which typically contains no data modulation, is transmitted by a base station or gateway throughout a given region of coverage. A single pilot is typically transmitted by each gateway or base station for each frequency used, typically referred to as a CDMA channel, an FDM channel, or as a sub-beam in some systems. This pilot is shared by all users using that CDMA channel, from a common source. Generally, sectors each have their own distinct pilot signals while satellite systems transfer a pilot within each satellite beam, or frequency or sub-beam, which originates with gateways using the satellite. This provides signals that can be readily distinguished from each other, also distinguishing between beams and cells while providing simplified signal acquisition.

Pilot signals are employed by user terminals to obtain initial system synchronization, and provide robust time, frequency, and phase tracking of transmitted signals and a channel gain reference. Phase information obtained from a pilot signal is used as a phase reference for coherent demodulation of communication system or user information signals. Since pilot signals do not generally involve data modulation, they essentially consist of the PN spreading codes which are modulated onto a carrier frequency. Sometimes, the PN spreading codes are referred to as pilot code sequences. The PN spreading codes are generally time shifted with respect to each other to achieve distinguishable pilot signals.

Pilot signals are generally used to gauge relative signal or beam strength for received communication signals. In many systems, pilot signals are also generally transmitted at a higher power level than typical traffic or other data signals to provide a greater signal-to-noise ratio and interference margin. This higher power level also enables an initial acquisition search for a pilot signal to be accomplished at high speed while providing for very accurate tracking of the pilot carrier phase using relatively wide bandwidth, and lower cost, phase tracking circuits.

As part of the process of establishing a communication link, the user terminal employs a receiver referred to as a 'searcher receiver', or simply 'searcher', to synchronize with the pilot phase and PN spreading code timing in the presence of unknown carrier frequency offsets. Several techniques and devices have been used to provide this searcher function. One such technique is disclosed in U.S. Pat. No. 5,109,390 entitled "Diversity Receiver In A CDMA Cellular Telephone System," issued Apr. 28, 1992, which is assigned to the assignee of the present invention, and incorporated herein by reference.

One of the problems associated with pilot acquisition/synchronization and signal demodulation processes is the amount of time required for users to acquire the pilot signals. More accurately, it is the amount of time required to acquire the phase or timing of the PN spreading codes used in generating pilot signals, for use in demodulating other communication signals.

In terrestrial repeater based systems, such as land based wireless cellular telephone services, a relatively long PN code sequence of 32,687 chips in length is used, which is docked at a chipping rate on the order of 1.2288 mega-chips per second (Mcps). This length is useful in differentiating signals in a system having a large number of closely spaced cells. Since such wireless systems have consistently strong pilot signals, acquisition times can remain short for this length. That is, with robust pilot signals, and little or no Doppler frequency shifting, or similar effects, the time required to select and verify a correct phase, or signal timing, is still relatively short. However, for satellite based systems, Doppler effects on the frequency, and degradation of pilot signal power along with lower power pilot signals, generally results in longer times for acquiring and verifying pilot signal timing.

Therefore, shorter PN spreading codes have been contemplated in order to help substantially shorten the overall searching or acquisition time in view of the lengthened time taken for testing hypotheses, verification, and so forth. In this type of communication environment, PN codes on the order of 1024 chips in length have been contemplated, which results in a code length of about 833 $\mu$sec., at the chip rate mentioned above. Many systems package information bearing channels into blocks of bits, or "frames," where frame synchronization is required before the bits can be used. The exact meaning or subsequent processing of the information bits is a function of location within the frames. Such data frames are typically 20 to 80 msec. in length, which creates problems in determining proper frame timing when working with the much shorter PN codes. A short PN code by itself leaves many unresolved hypotheses of frame timing. The correct frame timing can only be found by trial and error of the different hypotheses. This uncertainty in frame timing delays the acquisition of the information channels or signals.

Unfortunately, the path delays for signal transfers from gateways-to-satellites and satellites-to-users or transceivers also create a major problem for shortening the PN codes. The distances involved, even for low Earth orbits, impose significant path delays on signals, which can vary widely depending on satellite orbital positions. This results in the signal time offsets for different satellites or signal sources being significantly shifted relative to each other, so that signals otherwise offset from each other begin to be aligned, which prevents proper signal differentiation. That is, signals are affected by a dynamic range of path delays on the order of 7 msec. which means they are no longer adequately separated in time and cannot be properly distinguished as to beams or signal sources. The obvious solution of lengthening the PN spreading codes by even a small amount re-introduces undesirable time delays in signal acquisition.

Therefore, what is needed is a new technique for spreading forward link signals so that receivers can still acquire phase and beam identification information used for signal demodulation over short time intervals while compensating for relatively high signal delay paths and lower power pilot signals associated with satellites moving relative to signal recipients.

SUMMARY

In view of the above and other problems found in the art relative to acquiring and processing communication signals in spread spectrum communication systems, one purpose of the present invention is to improve signal acquisition.

One advantage of the present invention is that it provides for the use of short PN sequences for signal acquisition while maintaining signal differentiation for identification, and improving synchronization to information channel timing.

These and other purposes, advantages, and objects of the invention are realized in a method and apparatus for spreading signals in a spread spectrum communication system in which digital information signals are bandwidth spread using a preselected pseudorandom noise (PN) spreading code to produce spread spectrum modulation signals. An exemplary communication system is a wireless data or telephone system that uses multiple satellite repeaters to receive communication signals from gateway type base stations and transfer them to one or more of a plurality of mobile or portable stations having receivers. Information signals in such systems are generally converted from analog to digital form, as necessary, and then interleaved and encoded for error detection and correction purposes before being transferred to system users. The encoded signals may be combined with one or more orthogonal functions to provide channelization of the information signals.

In a preferred embodiment, a first PN spreading code is generated with a preselected first code length and first period or periodicity. This code is referred to as an inner code. A second PN code sequence is produced having a second predetermined code length, and a period substantially longer than the first. This code is referred to as an outer code. The PN codes can be generated using first and second PN generators, respectively. In some systems PN code generation devices or circuits may be time shared in generating some of the codes or sequences. The update or generation rate or "chipping rate" for the second PN code or code generator is significantly less than the update or generation rate of the first.

Typically, the first PN spreading code is input to a first spreading means or element where it is used to spread the information signals to be transmitted, resulting in the production of first spread spectrum signals. The resulting first spread spectrum signals are input to a second spreading element where they are combined with the second PN code sequence to produce second spread spectrum signals. Typically, multipliers are used to combine the PN codes and signals at each step. The resulting spread spectrum signals can be transferred to transmission circuits for modulating onto a carrier signal, followed by transmission by the communication system to one or more system users.

However, in further aspects of the invention the second PN code is combined with the information signals first and then the first PN code is used for spreading the resulting signals. Alternatively, the two codes are combined to produce a unique spreading code that is essentially an outer code modified inner code, which is then used to spread the information signals.

In an exemplary spread spectrum system, information signals are applied equally to an In-Phase channel and a Quadrature-Phase channel and the first spreading element uses a PN code generator to produce an In-Phase PN chip code for one channel using a first polynomial function, and a second PN code generator to produce a Quadrature-Phase PN chip code for the other channel using a second, different, polynomial function. The second spreading element uses a third PN code generator to produce a third PN chip code using yet another polynomial function The entire first PN spreading code period is equal to one chip period for the second PN code, and the respective periods of the PN codes are synchronized to begin at the same time. These codes can be implemented, for example, as pre-selected portions of m-sequence PN codes, or augmented length maximal-length linear sequence PN codes. The longer total code period PN code or code sequence forms an 'outer' code for which system timing is easier to acquire, while the shorter period PN spreading code forms an 'inner' code that maintains a desirable level of signal non-interference. The overall affect is to provide improved signal identification and synchronization to signal timing, while maintaining reasonably fast signal acquisition.

A code sequence found useful for the second PN code of the invention when a first PN code of length 1024 is used, is 288 chips long and has chip values beginning with the series or set −1 −1 1 −1 1 −1 −1 1 1 −1 −1 −1 1 −1 1 1 −1 −1 −1 −1 −1 1 −1 1, and ending with all remaining chips being 1. Alternatively, a code found useful is −1 −1 −1 1 1 −1 1 −1 −1 1 −1 1 1 1 −1 1 1 1 1 −1 −1 −1 −1 −1 −1 −1 −1 −1 1 1 1 1 . . . 1. Another code found useful is generated using the characteristic polynomial $Q(z)=1+z^3+z^4+z^6+z^9$, and then using a 288 chip sequence.

In further aspects of the invention, spreading elements can be implemented by storing pre-selected PN codes in data storage means or memory elements, such as ROM or RAM circuits. The codes are then retrieved and provided as inputs to multipliers that also receive corresponding information or spread signals as inputs.

The second PN code can also be differentially encoded, to reduce requirements for phase coherence, by passing the retrieved code through a one-chip delay element and inputting it to another multiplier which also receives undelayed code. The multiplier forms a product between the delayed and undelayed PN code, and provides the product as a differentially encoded output. Alternatively, the data storage could contain a differentially encoded version of the second PN code sequence.

On the reception side of the communication system, the timing of such multi-layered spread spectrum communication signals is acquired using a receiver in which communication signals are first demodulated to remove the carrier and then despread. A despreader or despreading means combines the received spread spectrum signal with the second or inner PN spreading code to produce a first level or intermediate despread signal. An accumulator is used to accumulate this despread signal over the period of the second PN code or a chip period of the first code, and differentially detects the phase shift between consecutive accumulated signals, or decodes the accumulated signals. The detected signal is subjected to a matched filtering process, and the results compared to a preselected threshold value. In addition, the threshold value used in this comparison can be preselected or produced by determining an average value for the magnitude of the detected signal over the first PN code period. This value can be scaled appropriately.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF PREFERRED EMBODIMENTS

The present invention provides a new technique for spreading or spread spectrum modulating information signals in a spread spectrum communication system to provide improved beam or signal source identification. This identification is useful for measuring time delays and determining signal timing for soft handoff and position determination operations, among others. The inventive technique eliminates the prior requirement to demodulate and process every beam received by a user terminal in order to properly identify a beam or its source.

This is accomplished by applying both a first PN spreading code or code set, and a second PN code sequence or function to the desired information spread signal. The second PN code sequence is synchronized with the first PN spreading code, but uses code chips with a longer chip period than those in the first PN sequence. That is, the second PN code is clocked at a rate in relation to the first so that each code chip of the second PN code extends over the entire period of the first PN code or code symbols. The second PN code forms an 'outer' code which improves identification of the signal source, here beams, and makes signal acquisition easier. The first PN code forms an 'inner' spreading code that provides a desirable level of signal isolation and differentiation, and prevents the beams from interfering with each other. The outer code can be thought of as an "overlay" on the first, or as creating "layered" PN codes. Together, the inner and outer codes act or interact to form a new type of spreading function or code that maintains the desired wide band spreading function while providing more robust beam or signal source identification for use in rapid signal acquisition and hand off.

Figure 1:
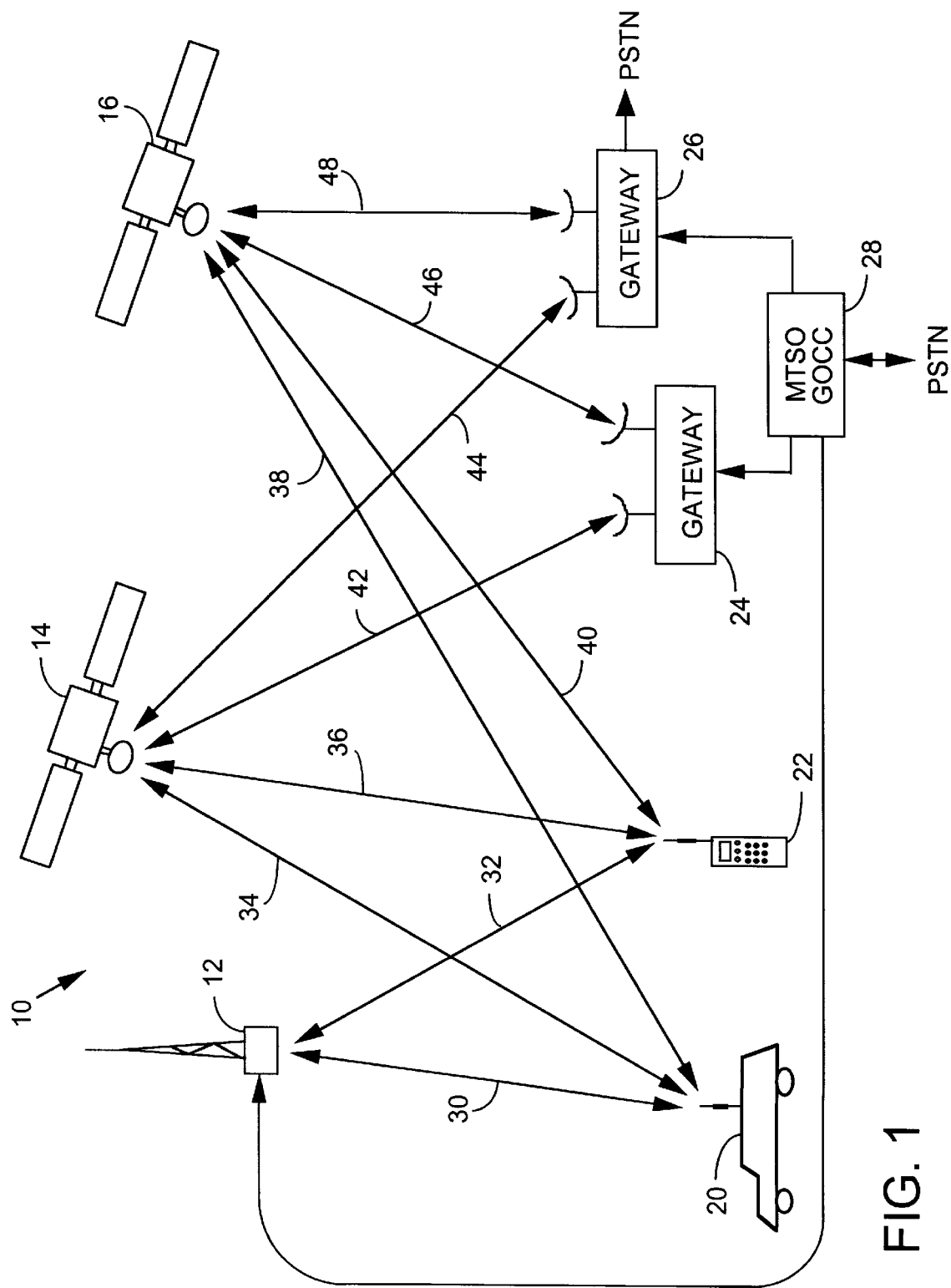
FIG. 1 illustrates a schematic overview of an exemplary wireless communication system.

An exemplary wireless communication system, such as a wireless telephone system, in which the present invention is used is illustrated in FIG. 1. Communication system 10 illustrated in FIG. 1 uses spread spectrum modulation techniques in communicating between remote or mobile user terminals and system gateways or base stations. In the portion of the communication system illustrated in FIG. 1, one base station 12 and two satellites 14 and 16, and two associated gateways or hubs 24 and 26 are shown for effecting communications with two mobile stations or user terminals 20 and 22, or other stations. The present invention may be useful in either or both satellite or terrestrial based communication systems, as will be readily apparent to those skilled in the art.

Mobile stations or user terminals 20 and 22 each have or comprise a wireless communication device such as, but not limited to, a cellular telephone, a data transceiver or transfer device (e.g., computers, personal data assistants, facsimile), or a paging or position determination receiver. Typically, such units are either hand-held or vehicle mounted as desired. Here, user terminal 22 is illustrated as a portable handheld telephone. While these user terminals are discussed as being mobile, it is also understood that the teachings of the invention are applicable to fixed units or other types of terminals where remote wireless service is desired. This latter type of service is particularly suited to using satellites to establish communication links in many remote areas of the world. In addition, the wireless service can be provided for structural interior areas as well as 'open air' locations.

It is contemplated for this example that satellites 14 and 16 provide multiple beams within 'spots' that are directed to cover separate generally non-overlapping geographic regions. Generally, multiple beams at different frequencies, also referred to as CDMA channels or 'sub-beams', or FDMA signals, frequency slots or channels, can be directed to overlap the same region. However, it is readily understood that the beam coverage or service areas for different satellites, or antenna patterns for terrestrial cell-sites, may overlap completely or partially in a given region depending on the communication system design and the type of service being offered. Space diversity may also be achieved between any of these communication regions or devices. For example, each may provide service to different sets of users with different features at different frequencies, or a given user terminal may use multiple frequencies and/or multiple service providers, each with overlapping geophysical coverage.

In FIG. 1, some possible signal paths are illustrated for communications being established between user terminals 20 and 22 and base station 12 or through satellites 14 and 16 to one or more gateways or centralized hubs 24 and 26. The base station-user portions of communication links between base station 12 and user terminals 20 and 22 are illustrated by lines 30 and 32, respectively. The satellite-user portions of communication links between gateways 24 and 26 and user terminals 20 and 22 through satellite 14 are illustrated by lines 34 and 36, respectively. The satellite-user portions of communication links between gateways 24 and 26 and user terminals 20 and 22 through satellite 16 are illustrated by lines 38 and 40, respectively. The gateway-satellite portions of these communication links are illustrated by a series of lines 42, 44, 46, and 48. The arrowheads on these lines illustrate exemplary signal directions for each communication link, as being either a forward or a reverse link, and are present only for purposes of clarity and not as indicating any actual signal patterns or physical restrictions.

As seen in FIG. 1, communication system 10 generally uses a system controller and switch network 28, also referred to as mobile telephone switching office (MTSO) to communicate with base stations. MTSO 28 typically includes interface and processing circuitry for providing system-wide control for gateways or base stations, and to control routing of telephone calls between a public switched telephone network (PSTN) and base stations, and user terminals. Gateways generally interface directly with the PSTN and do not require the use of a MTSO for this function. Alternatively, other control and command centers such as a ground operations command and control centers (GOCC), which also communicate with satellites, are generally connected to the gateways or base stations to provide system wide control over certain operations including PN and orthogonal function code assignments. The communication link that couples GOCC or MTSO 28 to various system gateways or base stations can be established using known techniques such as, but not limited to, dedicated telephone lines, optical fiber links, or microwave or dedicated satellite communication links.

While only two satellites are illustrated in FIG. 1, the communication system generally employs multiple satellites 14 and 16 traversing different orbital planes. A variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations, including other orbital distances and constellations.

The terms base station and gateway are sometimes used interchangeably in the art, with gateways being perceived as specialized base stations that direct communications through satellites and have more 'functions,' with associated equipment, to perform to maintain such communication links through moving relay elements or repeaters, while base stations use terrestrial antennas to direct communications within a surrounding geographical region. Central control centers will also typically have more functions to perform when interacting with gateways and satellites. User terminals are also sometimes referred to as subscriber units, mobile units, or mobile stations, or simply "users," "mobiles," or "subscribers" in some communication systems, depending on preference.

As discussed above, each base station or gateway transmits a 'pilot carrier' signal throughout a region of coverage.

For satellite systems, this signal is transferred within each satellite 'beam' and originates with gateways being serviced by the satellite. A single pilot is typically transmitted by each gateway or base station for each satellite-to-user beam frequency (sub-beam). This pilot is shared by all users receiving signals over that beam. This technique allows many traffic channels or user signal carriers to share a common pilot signal for carrier phase reference.

Pilot signals generally use the same PN spreading code pair or set of codes throughout the communication system but with different relative code timing offsets for each beam, cell, or sector. Within a given satellite spot, each beam has a pilot with a PN code that is time offset from the pilot of neighboring beams. User terminals operating within the coverage of a given beam or cell share a single PN spreading code phase while different beams use different time offsets of the basic PN spreading code sequence. This provides signal isolation or reduces interference and allows beams to be readily distinguished from each other. Using one pilot signal code sequence allows user terminals to find system timing synchronization with a single search over all pilot signal code phases. Alternatively, different PN spreading codes (generator polynomials) are used between some gateways or base stations. In satellite communications systems, different sets of PN codes can be assigned for use within each orbital plane. Each communication system design specifies the distribution of PN spreading codes and timing offsets within the system according to factors understood in the art.

Each PN sequence consists of a series of 'chips' occurring over a preselected PN code period at a frequency much higher than the baseband communication signal being spread. A typical chip frequency or chipping rate is around 1.2288 MHz with a PN code sequence length or period of 1024 chips. However, as previously discussed, this code length may be adjusted to increase code separation, or decrease searching times, as would be apparent to those skilled in the art, as specified within each communication system design according to factors understood in the art. An exemplary generation circuit for these sequences is disclosed in U.S. Pat. No. 5,228,054 entitled "Power Of Two Length Pseudo-Noise Sequence Generator With Fast Offset Adjustments," issued Jul. 13, 1993, and assigned to the assignee of the present invention, and incorporated herein by reference.

Figure 2:
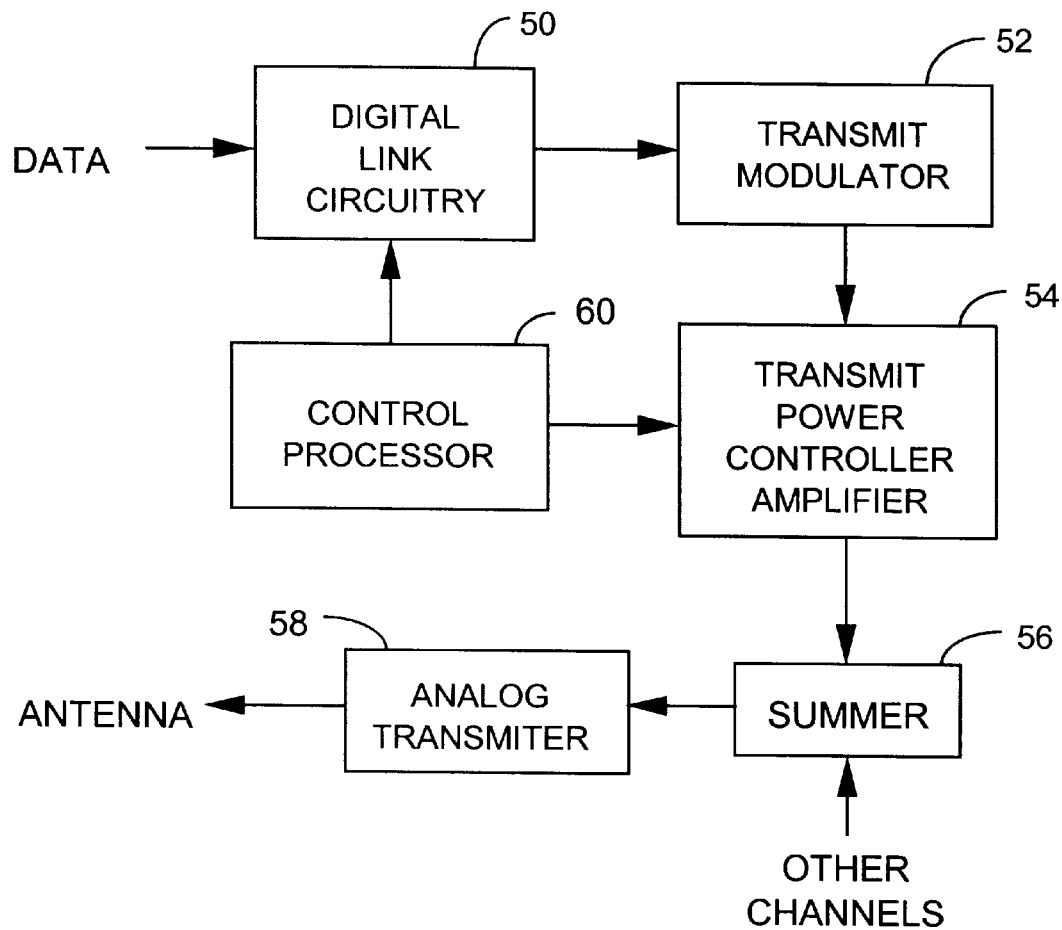
FIG. 2 illustrates a block diagram of a transmission stage for a gateway.

An exemplary design for a transmission section or portion of base station or gateway apparatus used to implement a CDMA communication system is illustrated in FIG. 2. In a typical gateway, several such transmission sections or systems are utilized to provide service to many user terminals at a time, and for several satellites and beams at any time. The number of transmission sections used by the gateway is determined by factors well known in the art, including system complexity, number of satellites in view, subscriber capacity, degree of diversity chosen, and so forth. Each communication system design also specifies the number of antennas available for the transmission sections to use in transferring signals.

As shown in FIG. 2, signals originating from an MTSO, within the communication system, or from other signal combiners, are coupled to an appropriate transmit modulator for transmission to a recipient subscriber using a digital link 50. The circuitry used to construct digital link 50 is well known and typically involves various known digital data switching and storage components. Digital link 50 also generally includes analog-to-digital conversion circuitry or elements for preparing information signals for digital transmission processing. Transmit modulator 52 spread spectrum modulates data or information signals for transmission to an intended recipient user terminal and provides the resulting signal to a transmit power controller/amplifier 54 which controls the final amount of transmission power used for the outgoing signal. Further details with respect to the structure and operation of exemplary transmit modulators 52 are discussed in U.S. Pat. No. 5,103,459, entitled "System And Method For Generating Signal Waveforms In A CDMA Cellular Telephone," which is assigned to the assignee of the present invention and incorporated herein by reference.

The output of power controller/amplifier 54 is summed with the output of other transmit power control and amplification circuits used in the gateway. These are amplified signals directed to other user terminals on the same transmission frequency and within the same beam. This summation is accomplished in or using a well known signal summation element or means 56. The output of signal summer 56 is provided to an analog transmitter 58 for conversion to the appropriate carrier frequency, and further amplification and output to one or more antennas for radiating to user terminals through satellites. A control processor 60 controls the generation and power of the pilot, synchronization channel, and paging channel signals and their coupling to power controller/amplifier 54 before being summed with the other signals and output to an antenna.

Before information signals are transferred to system users or subscribers, they are first digitized, as necessary, and encoded and interleaved as desired, to create a basic digital communication signal. Signals addressed to specific users are also modulated by a distinct orthogonal spreading function or code sequence assigned to that user's forward link. That is, a unique covering orthogonal code, typically a Walsh code, is used to distinguish between different users or subscriber signals within a cell or beam. This coding on the forward link of a given carrier frequency produces user signals also referred to as channels. Such orthogonal spreading functions are sometimes referred to as channelizing codes, and are typically applied prior to a final PN spreading operation, although they can first be combined with the PN spreading codes and then applied in a single covering/spreading step.

Figure 3:
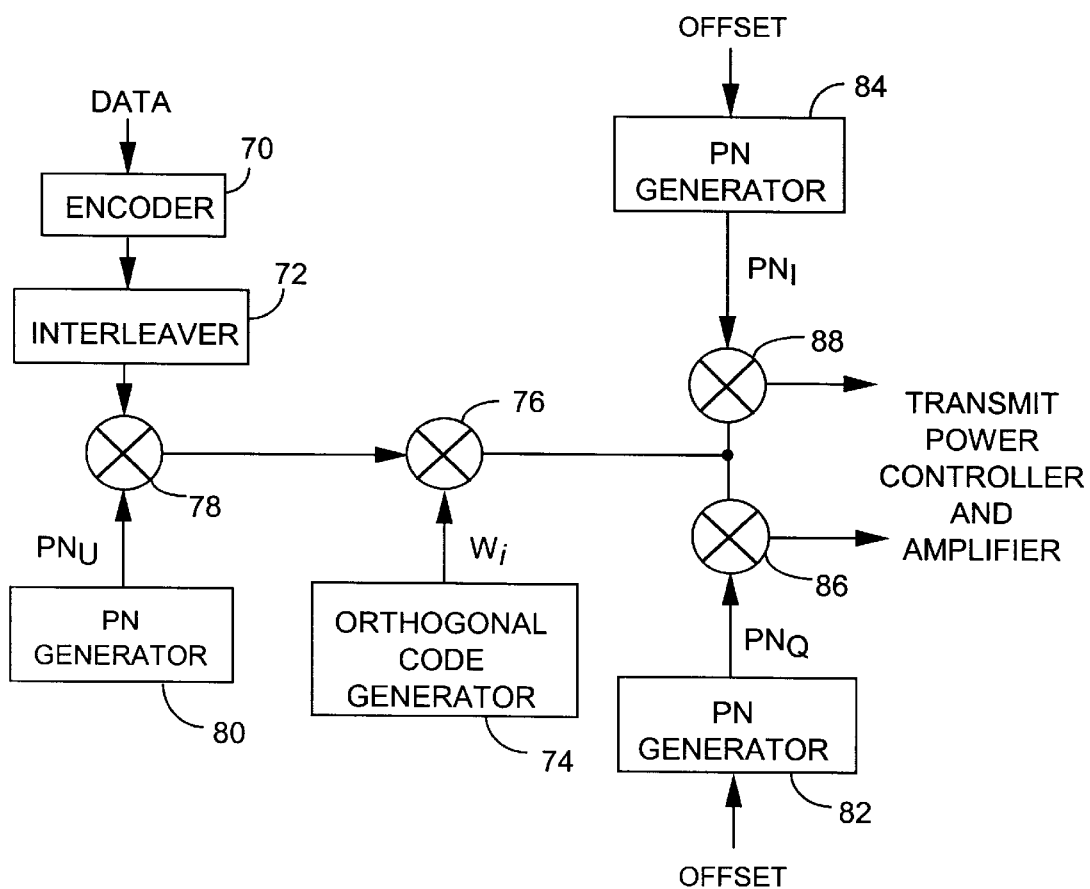
FIG. 3 illustrates a transmit modulator for the transmission stage of FIG. 2.

An exemplary signal modulator design for implementing transmit modulator 52 is illustrated in further detail in FIG. 3. In FIG. 3, modulator 52 includes an encoder 70 and an interleaver 72 for encoding, such as by convolutionally encoding, with repetition, and interleaving data symbols in order to provide error detection and correction functions. Techniques for convolutional encoding, repetition, and interleaving are well known in the art, as are other techniques for preparing digital data for transmission. The teachings of the present invention are not limited by the method of preparing the digital data prior to spreading. The data symbols from interleaver 72 are then orthogonally encoded or covered with an assigned orthogonal code, here a Walsh code, supplied by a code generator 74. The code from generator 74 is multiplied by, or otherwise combined with, the symbol data using one or more logic elements 76. The chip rate of the orthogonal code, as well as the encoded data, is determined by factors well understood by those skilled in the art.

Before or after being covered by the Walsh code, the interleaved data may also be multiplied with a binary $PN_U$ sequence in a second logic element 78 connected in series with either the input or output of multiplier 76. This sequence is provided by a PN code generator 80 and corresponds to a unique PN sequence generated by or for each user terminal. Code generator 80 can be constructed using a variety of known elements configured for this purpose. A user terminal address or user ID may be used to provide an additional factor for discriminating among system users. In the alternative, a non-linear encryption generator, such as an encryptor using the data encryption standard (DES) and a user specific key, may be utilized in place of PN generator 80 as desired. The $PN_U$ code is often a very long code generated at a high chip rate and then decimated to provide a lower rate such as 19,200 kbps. When binary '0' and '1' values are used for implementing the chips in the orthogonal and $PN_U$ codes, the multipliers can be implemented by logic elements such as exclusive-OR gates.

The transmit modulator circuitry also includes two PN generators, 82 and 84, which generate two different $PN_I$ and $PN_Q$ spreading codes for In-Phase (I) and Quadrature (Q) channels, respectively. These generators could be time shared among several transmitters using appropriate interface elements. An exemplary generation circuit for these sequences is disclosed in U.S. Pat. No. 5,228,054 entitled "Power Of Two Length Pseudo-Noise Sequence Generator With Fast Offset Adjustments," issued Jul. 13, 1993, and assigned to the assignee of the present invention, and incorporated herein by reference. Alternatively, the PN codes can be pre-stored in memory elements such as a ROM or RAM circuit, such as in the form of look-up tables with automatic indexing or addressing. These PN spreading codes can also be the same code applied 90° out of phase in some applications.

PN generators 82 and 84 also respond to at least one input signal corresponding to a beam or cell identification signal from the control processor which provides for a predetermined time delay or offset for the output of the PN spreading codes, as appropriate. Although only two PN generators are illustrated for generating the $PN_I$ and $PN_Q$ spreading codes, it is readily understood that many other PN generator schemes, using more or fewer generators, may be implemented.

The orthogonally encoded symbol data output from multiplier 76 is multiplied by the $PN_I$ and $PN_Q$ spreading codes using a pair of logic elements or multipliers 86 and 88. The same data is input to both multipliers and subjected to combination with or modulation by the individual codes. The resulting signals are then transferred to appropriate power control and amplification circuitry, transmit power controller 54 and analog transmitter 58. The resulting PN spread and orthogonally encoded output signals are then typically bandpass filtered and modulated onto an RF carrier, typically by bi-phase modulating a quadrature pair of sinusoids that are summed into a single communication signal. However, it will be readily apparent that other types of modulation can be used within the teachings of the invention.

The resulting signals may be further amplified and filtered before being summed with other forward link signals and radiated by an antenna for the gateway. The filtering, amplification, and modulation operations are well understood in the art. As is known, alternate embodiments may interchange the order of some of these operations for forming a transmitted signal. Additional details on the operation of this type of transmission apparatus are found in U.S. Pat. No. 5,103,459, mentioned above.

The above apparatus and process is also used to generate the pilot signals except that there is no encoded or interleaved data to be processed. Instead, a constant level signal is covered with a unique code, and then spread using logic elements 86 and 88. Where desired, data in the form of a repetitive or unchanging pattern, or with a non-varying frame structure, could also be used to formulate a pilot signal. That is, the orthogonal function used to form the channel for the pilot signal generally has a constant value, such as all 1's or 0's, or a well known repetitive pattern, such as a structured pattern of interspersed 1's and 0's. Alternatively, the pattern can also be gated on and off or multiplexed with data, such as from a data channel. The pilot signal is also typically provided with more power when processed by transmit power controller 54 and analog transmitter 58, to assure adequate energy for reception even on the fringes of beams, although this is not required. Once modulated onto the RF carrier, the pilot is transferred into each beam, or CDMA channel, serviced by the gateway, as desired.

While the above technique provides a desired level of PN spreading which is useful for terrestrial cellular or wireless systems, it has certain drawbacks when implemented with satellite repeaters, as discussed above. When used in satellite applications or for some more complicated terrestrial applications, the PN spreading codes typically used are too long to allow rapid enough signal acquisition. However, when used in the presence of the longer signal delays discussed above, or with lower power or attenuated pilot signals, as typically expected for satellite based repeaters, short PN spreading codes do not provide a practical alternative. That is, additional problems associated with lower power pilot signals or various signal path delays results in increased uncertainties in signal acquisition for short PN codes, which in turn increases acquisition times. Therefore, employing shorter PN codes has not proven practical using current satellite based communication system designs.

The present invention overcomes the problems associated with using either long or relative short PN spreading codes, by using a multiple level or 'layered' PN spreading technique. Viewed another way, the invention creates a new highly specialized or robust spreading code through combination of a PN spreading code and a unique identifier or outer PN code sequence. The new spreading code essentially increases the time scale for the spreading code without increasing acquisition times. This new spreading technique improves the manner in which communication signals are received and demodulated by user terminals in a spread spectrum communication system, decreasing the time for signal acquisition in a reliable manner.

Figure 4A:
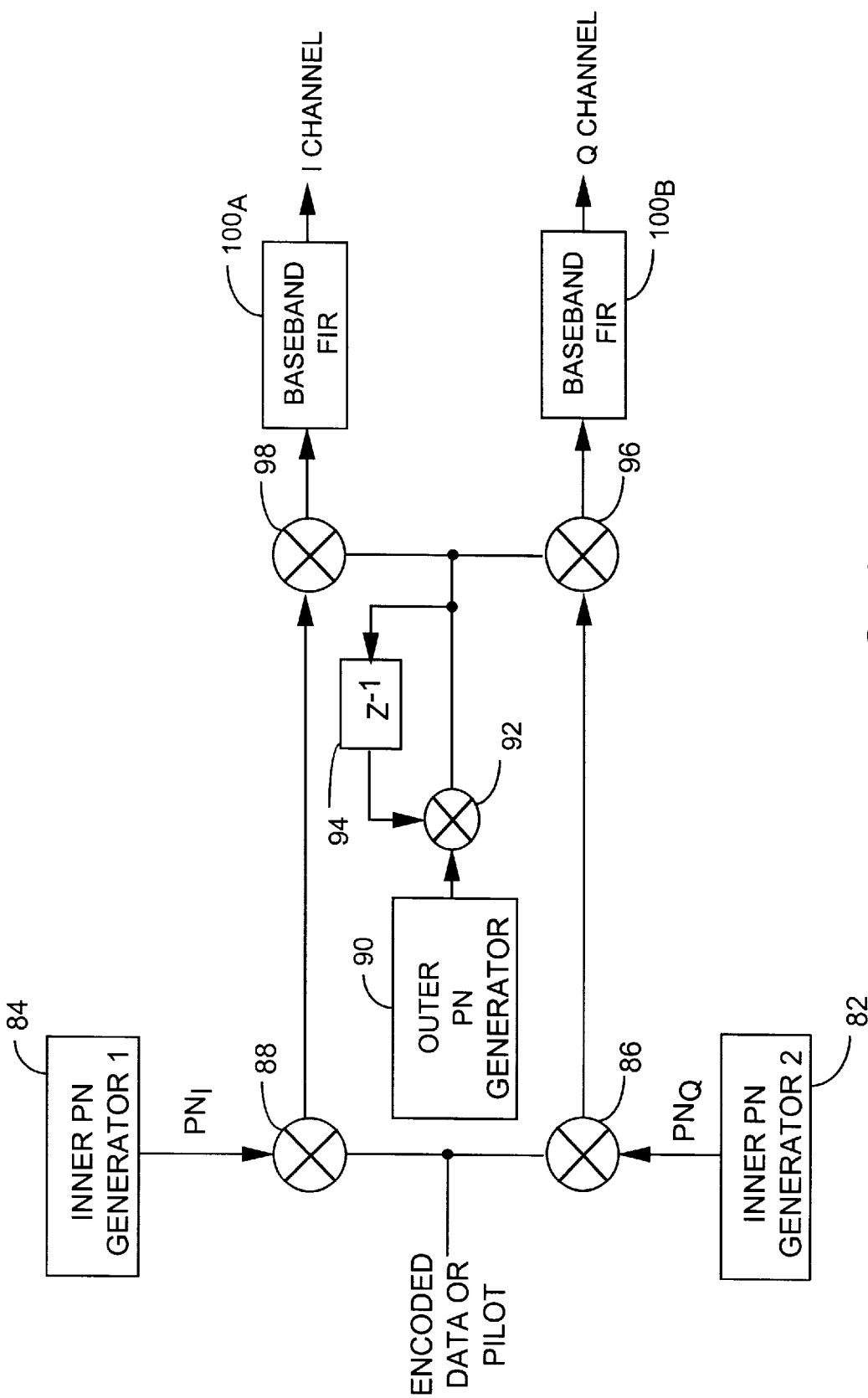
FIGS. 4a and 4b illustrate dual stage PN spreading sections for the transmit modulator of FIG. 3, constructed and operating according to the principles of the present invention.
Figure 4B:
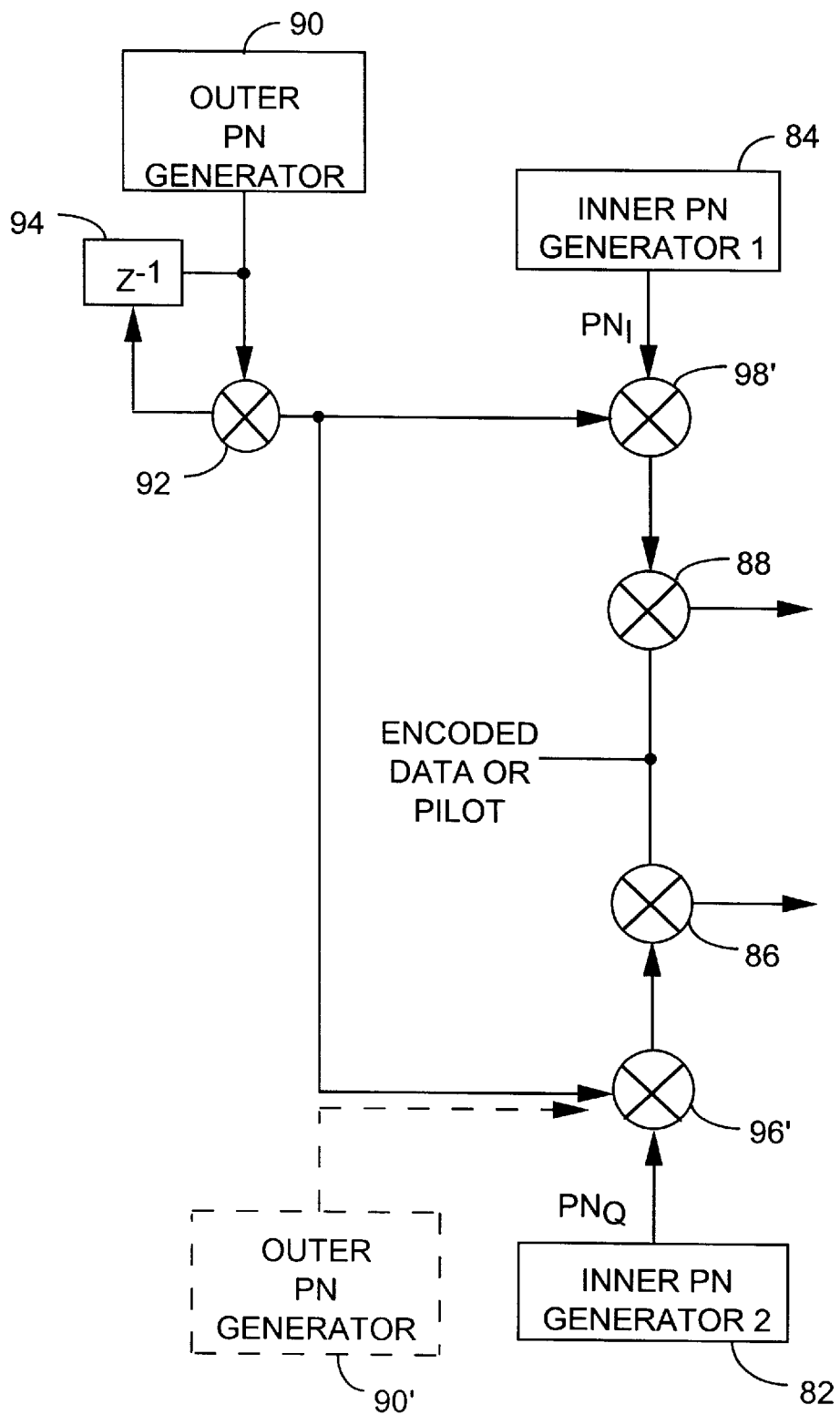

Exemplary embodiments of spreading apparatus useful for implementing a CDMA communication system using the present invention are illustrated in FIGS. 4a and 4b. In the spreader of FIG. 4a, the previously encoded, interleaved, and orthogonally covered data or information signals are received, as before, by signal combiners or multipliers 86 and 88. At this point, the primary or 'inner' PN spreading codes $PN_I$ and $PN_Q$ are applied from inner code generators 82 and 84, as before. This produces I channel and Q channel spread spectrum communication signals. These signals can be thought of as being spread or modulated on a first level or layer by the $PN_I$ and $PN_Q$ spreading codes. However, instead of transferring the resulting spread signals to the transmit power controller and analog transmission elements, as previously shown, they are subjected to a second level of PN spreading.

As shown in FIG. 4a, at least one additional PN code generator 90 is provided which generates a PN code that is synchronized with the timing of the $PN_I$ and $PN_Q$ spreading codes but has a much longer period. This code can be generated using known apparatus as discussed above, or can be pre-stored in memory elements for later retrieval during signal processing.

As stated above, a typical inner PN code is on the order of 1024 chips or more in length and applied at a rate on the order of 1.2288 Mcps (Mega/Million-chips-per-second) over an interval or code period of about 833 μsec. The new outer PN code is on the order of 255 to 288 chips in length and applied at a slower rate on the order of 1200 cps, over an interval or code period of about 240 msec. The exemplary embodiment discussed herein uses 288 chips only for purposes of illustration, although other code lengths (in terms of number of chips) clearly fall within the teachings of the present invention. It is simply desired that the outer code sequence have a code period much longer than the inner PN spreading code The sequence used for the new outer PN code can be any reasonable pseudorandom binary sequence. For the 288 chip length example, a full m-sequence ($2^m-1$) cannot be used but a portion of a longer m-sequence could be used, sometimes referred to as a "chopped" sequence. Spectrally white sequences are preferred, in order to minimize acquisition time for the outer PN timing by a user, but are not required for purposes of the invention. The outer code is generally a "real" code while the inner code is a "complex" code.

The code length is chosen relative to certain timing relationships for the particular communication system, as would be known to those skilled in the art, and depends on hardware constraints for correlators and other signal acquisition apparatus. That is, code chip length or period is chosen based on correlator restraints among other factors, but the overall code length is chosen in relation to the length of time required to resolve path delay and frame timing ambiguities. In this example, one inner spreading code period (code length) is contained within the period of a single outer PN code chip. The outer PN spreading code modulates the inner PN sequences (pilot signal), or data and Walsh symbols (traffic signals), to produce the final spread sequence that is used.

The outer PN spreading code is then combined with the outputs of combiners 86 and 88. While this combination can occur directly, such as by multiplication, improved performance and operation over a greater range of frequency offsets can be achieved using a differential encoding scheme. The differential encoding reduces requirements for phase coherence to a period of about two outer PN chips. Therefore, in the preferred embodiment, the outer code output from PN code generator 90 is first differentially encoded using a multiplier 92 and a delay element 94. The outer PN code is provided as one input to multiplier 92 which receives a second input from delay element 94, which has an input connected to the output of multiplier 92. The value used for the delay imposed by element 94 is one chip period, as determined by the outer PN code chip rate. This loop back arrangement forms a product between each chip in the outer PN code at time k and a previous chip at time k-1 (for 1 chip delay). This provides a coded PN sequence that is applied as an additional NRZ (±1) type cover. In one embodiment, a value of '0' can be used to encode the first chip, since there is no earlier chip While a first-order difference or differential encoding has been described, those skilled in the art will appreciate that other delays and higher order differences, other than the single order discussed above, can be used. However, this will require longer coherence times in the channel, and may not be advantageous in many systems. Not only a first order difference approach, but a second order difference approach could be useful for some applications. For example, a scheme like DDPSK would require less coherence. Therefore, this can be expanded to include: coherent, differential, and second-order differential detection. However, first and second order difference is probably sufficient for most applications.

The differentially encoded PN sequence is transferred from multiplier 92 to each of two multipliers 96 and 98. Multipliers 96 and 98 each receive the encoded PN sequence as one input and one of the $PN_I$ or $PN_Q$ spread information signals, respectively, as a second input. These signals are then multiplied together to spread the $PN_I$ or $PN_Q$ signals by the differentially encoded outer PN sequence. This results in spread spectrum modulation signals that are spread by inner and outer PN codes for the I and Q channels. These modulation signals can each be transferred through one of two baseband FIR filters $100_A$ and $100_B$, to remove undesirable signal components resulting from the multiple spreading or other operations.

In the spreader of FIG. 4b, the previously encoded, interleaved, and orthogonally covered data or information signals are received, as before, by signal combiners or multipliers 86 and 88. However, the primary or 'inner' PN spreading codes $PN_I$ and $PN_Q$ are applied to each of two multipliers 96' and 98'. Multipliers 96' and 98' each receive the encoded outer PN sequence as one input and one inner PN code as a second input from inner code generators 82 and 84, respectively. The combination or product of the two codes is then applied as the input to multipliers 86 and 88. Alternatively, the outer PN code can be applied without differential processing as shown by the dashed element 90'.

Figure 5:
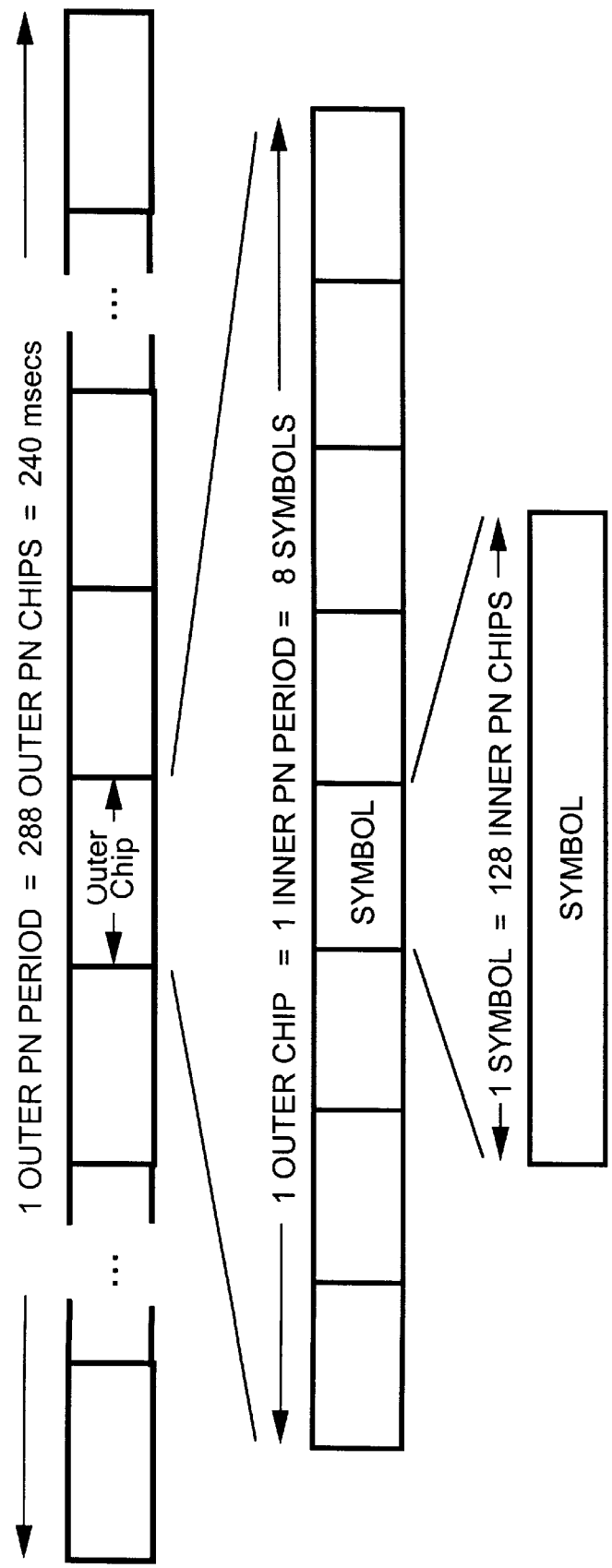
FIG. 5 illustrates exemplary relative inner and outer PN spreading code and PN identifier code timing.

The relationship of the outer and inner PN spreading codes and the encoded data symbols is illustrated in further detail in FIG. 5. The covered data symbols are configured in this example as being 128 chips long and as being clocked into the system at the spreading code rate of 1.2288 Mcps. This is commensurate with a channelizing code of length 128, but other lengths, such as 64, could be used as desired. This results in eight code symbols (of 128 chips each) per inner PN spreading code period (1024 chips).

The outer PN code (chip) remains constant over the entire inner PN code period, that is, one constant value outer PN chip covers the period of 1024 inner PN chips. Therefore, by properly synchronized searching, a user terminal can acquire the inner PN code timing first and then resolve the outer PN code timing to achieve the desired timing control. However, to use this approach a user terminal should know or be able to adequately approximate when the outer PN chip boundaries occur. This information is used to prevent the user terminal receivers from integrating signal energy, across boundaries, which leads to or provides inaccurate timing results. Therefore, as shown in FIG. 5, the outer PN chip boundaries are aligned to occur at inner PN code period boundaries using known system timing.

Once a gateway has prepared the spread spectrum communication signals and transmitted them through satellites, they must be received by the various user terminals and the appropriate signal timing determined. A user terminal receiver portion for receiving, despreading, and detecting or decoding communication signals employing the PN coding techniques discussed above, is illustrated in part in FIG. 6. The user terminal shown in FIG. 6 could reside, for example, in a wireless communications device such as, but not limited to, a portable or mobile cellular or satellite telephone.

Figure 6:
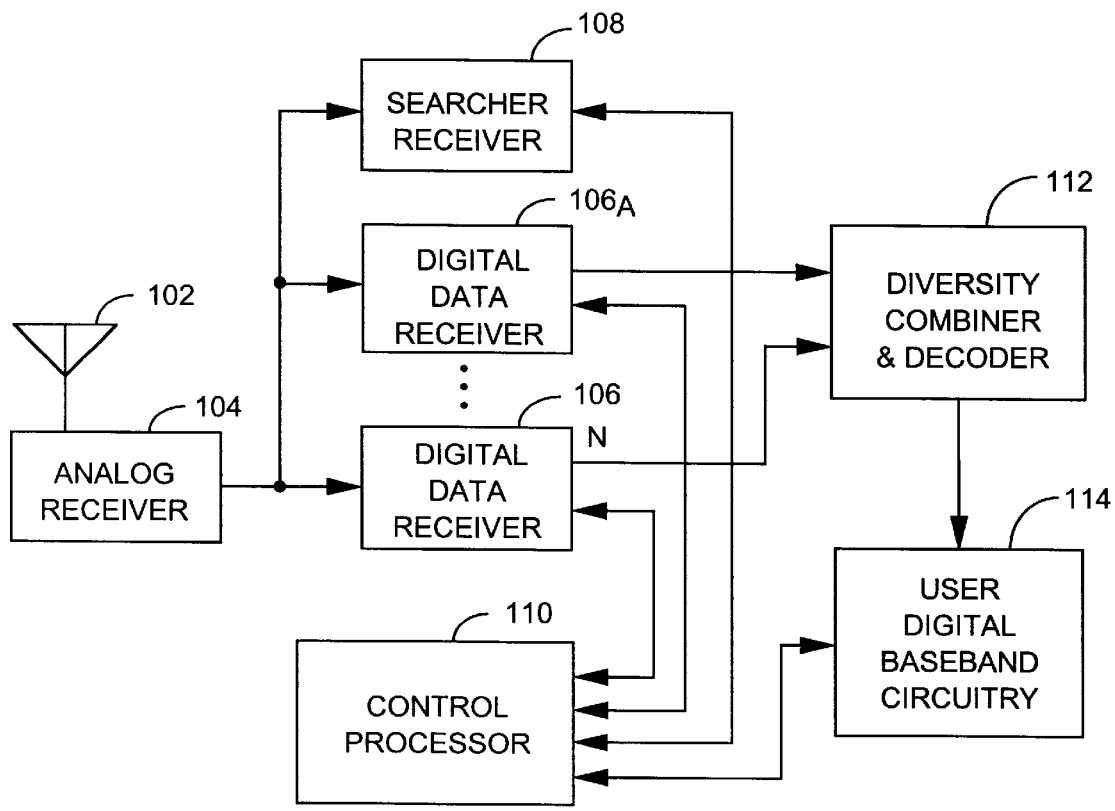
FIG. 6 illustrates a user terminal receiver.

The receiver portion illustrated in FIG. 6 uses at least one antenna 102 to receive and transfer communication signals to an analog receiver or receiver system 104. The received communication signals are downconverted in analog receiver 104 and amplified, before being translated to an appropriate IF or baseband frequency, and subjected to filtering and further amplification. The resulting amplified signals are then digitized at an appropriate clock rate and output to at least one digital data receiver $106_A$ and at least one searcher receiver 108. These outputs are illustrated for purposes of clarity as combined in-phase and quadrature phase channel signals, but are generally in the form of separate I and Q channels.

Additional digital data receivers $106_B$–$106_N$ are used to obtain signal diversity, which may be optional for some system designs. Those skilled in the art will readily recognize the factors that determine the number of digital receivers employed, such as typical level of diversity available, complexity, manufacturing reliability, cost, etc., which are used to provide an initial selection for this number. The number of searcher receivers may exceed one and also depends on communication system complexity, number of channels to be searched, desired signal acquisition speed, timing restrictions, etc., as understood by those skilled in the art.

The user terminal also includes at least one control processor 110 coupled to digital data receivers $106_A$–$106_N$ along with searcher receiver 108. Control processor 110 generally provides, among other functions, basic signal processing, timing, power and handoff control or coordination, diversity, diversity combining functions, and selection of frequency used for signal carriers. Another basic control function often performed by control processor 110, is the selection or manipulation of pseudonoise (PN) code sequences or orthogonal functions or code sequences to be used as part of signal transmission and reception processing. This may include the phase or PN code timing offsets used for acquiring various signals.

The outputs of data receivers $106_A$–$106_N$ are coupled to a diversity combiner and decoder 112 which provides a single output to digital baseband circuitry 114 under the control of processor 110. The baseband circuitry comprises the remainder of the processing and presentation elements used within the user terminal to transfer information to and from a unit user. That is, signal or data storage elements, such as transient or long term digital memory; input and output devices such as LCD or video display screens, speakers, keypad terminals, and handsets; A/D elements, vocoders and other voice and analog signal processing elements; all form parts of the subscriber baseband circuitry which uses elements known in the art. As shown in FIG. 6, some of these elements may operate under the control of, or in communication with, control processor 110.

In order to establish or maintain a communication link through a particular digital data receiver, one or more searcher receivers 108 are assigned to scan across preselected PN codes and code time offsets, and Doppler frequency space, of received communication signals to acquire a signal. That is, to periodically search data received from analog receivers and determine if a pilot (or other desired signal) is present; or to first determine which signal being received is an appropriate pilot signal for use in subsequent signal reception and decoding. In many systems the strongest signal is the pilot signal, but this is not required and is probably not the case for some satellite communication systems. That is, while the pilot signal can be allocated additional power relative to a typical traffic channel signal to assure proper and efficient, fast, tracking and acquisition, this may consume more power than desired, and result in undesirable interference. However, the process of the invention can use the strongest signal regardless of whether or not it is a pilot signal, as long as the PN code timing is appropriate, or a weak pilot signal.

One method of determining when pilot (or other) signal timing has been acquired is to establish or select estimated phase offsets as 'hypotheses' of the pilot signal PN code phase and then test them by despreading communication signals, and accompanying noise, using locally generated reference PN spreading codes applied at those timing offsets. The energy associated with signal chips in correlated signals is then integrated over a preselected time interval, and compared to one or more predetermined threshold values. The accumulated energy should be highest, or at least exceed a certain threshold level, when the local reference and signal PN spreading codes have the same timing.

Apparatus useful for performing such energy measurements in making PN code timing detection decisions, sometimes referred to as computing test statistics, are described in further detail in U.S. Pat. No. 5,644,591, entitled "Method And Apparatus For Performing Search Acquisition In A CDMA Communication System", and U.S. Pat. No. 5,577,025, entitled "Signal Acquisition In A Multi-User Communication System Using Multiple Walsh Channels," which issued Nov. 19, 1996, and which are incorporated herein by reference.

Figure 7:
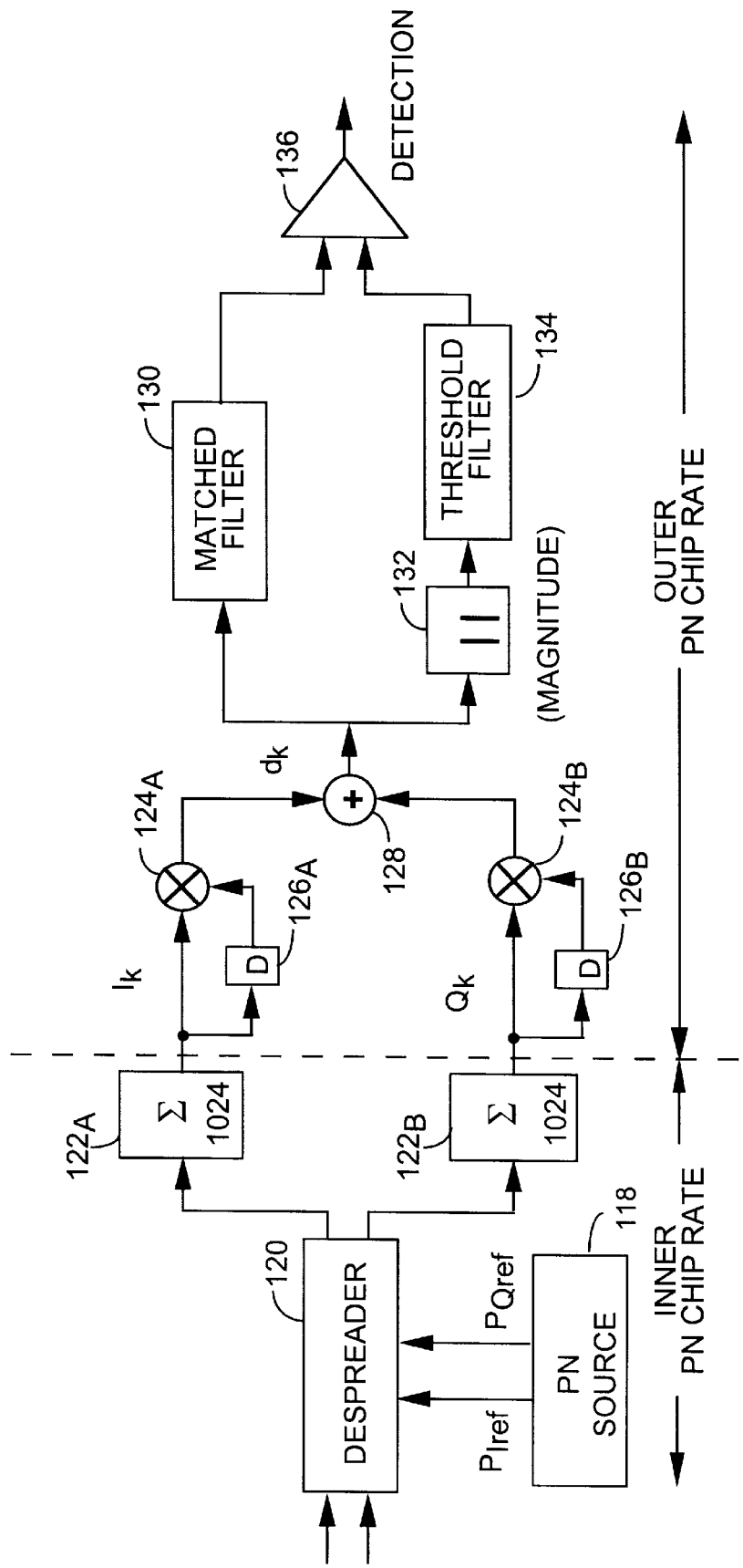
FIG. 7 illustrates a dual level PN code correlator and signal acquisition circuit for the receiver of FIG. 6.

Exemplary apparatus for acquiring signals using the new outer spreading or PN code is illustrated in FIG. 7. Operation of this apparatus assumes that the innermost of the two PN codes, or code sets, has already been acquired, such as using the apparatus disclosed in the patents referenced above. That is, user terminal circuits have already determined an appropriate time offset for the inner PN code. After such a first level of signal acquisition, the estimated or determined time offset for the inner PN spreading code is then used in despreading received signals relative to the inner PN code to provide outer PN code spread data symbols.

The despreading is performed by inputting locally generated $PN_{I\text{-}inner}$ and $PN_{Q\text{-}inner}$ spreading codes as inputs to a despreader or correlation element 120. These codes are then applied to received communication signals using the previously determined inner PN code time offset. The output of despreader 120 is input into a pair of accumulators or accumulate and sum elements $122_A$ and $122_B$. Accumulators $122_A$ and $122_B$ accumulate the despreader output for either the I or Q channel over the period of the inner PN code. Since, each outer PN 'chip' period extends over the inner PN code (symbol) period, symbol energy is accumulated over this period to provide the energy for each outer PN code chip. The $I_k$ and $Q_k$ values shown in FIG. 7 correspond to the $k^{th}$ I and Q outer spreading code PN chips that are formed by accumulating 1024 of the I and Q inner spreading code chips, for the exemplary embodiment. Other spreading code lengths result in other correspondingly different accumulation periods or numbers of chips.

To acquire the outer PN code from the $I_k$ and $Q_k$ values, the user terminal receiver must first perform feed-forward differential decoding of the signals. An exemplary technique for accomplishing this decoding is to use a dot product structure, such as generally used in data demodulation. A further discussion of such a structure and its operation for data demodulation is found in U.S. Pat. No. 5,506,865, entitled "Pilot Carrier Dot Product Circuit," which is assigned to the assignee of the present invention, and incorporated herein by reference.

In the technique disclosed in the above patent, a dot product is formed between a data signal vector and a reference vector derived from a received pilot signal. A typical data vector has symbol lengths of 64 or 128 chips, this being the length of the orthogonal channelizing codes. However, in contrast to the data signal reception situation, the present "symbol" period is 1024 inner chips, and the current ($I_k$, $Q_k$) signal vectors are dotted with a previous signal vector rather than with a reference vector. The same outer PN code is used on both the I and Q channels and the mean value (chip energy E) of one outer PN chip on either of these channels has the form:

$$E\{I_k\} = E\{Q_k\} = \pm 1024\sqrt{\frac{E_c}{2}}$$

where $E_c$ is received signal chip energy, $E\{I_k\}$ is the mean value for the I channel, and $E\{Q_k\}$ is the mean value for the Q channel.

The dot product associated with an outer PN chip k has the form:

$$d_k = I_k I_{k-1} + Q_k Q_{k-1}.$$

When outer spreading code PN chip k is the same as its predecessor, k−1, then the mean value of $d_k$ is simply $(1024)^2 E_c$ (code length squared times the chip energy). If, however, the outer PN chips differ from each other, the mean value of $d_k$ is $-(1024)^2 E_c$ and the desired differential decoding has been accomplished.

Differential decoding of the received chips using dot product processing is shown schematically on the left side of FIG. 7. The output of accumulator $122_A$ is provided as one input to a multiplier $124_A$, and the output of accumulator $122_B$ is provided as one input to a multiplier $124_B$. At the same time, the outputs of accumulators $122_A$ and $122_B$ are also provided as inputs to each of a pair of delay elements $126_A$ and $126_B$, respectively. The outputs of these delay elements are in turn provided as second inputs to multipliers $124_A$ and $124_B$, respectively. Delay elements $126_A$ and $126_B$ impart a delay of one outer PN chip period to the $I_k$ and $Q_k$ signals before they are input to the multipliers. This results in multipliers $124_A$ and $124_B$ forming products between each PN chip k and its predecessor.

The products formed in multipliers $124_A$ and $124_B$ for the $k^{th}$ and $(k-1)^{th}$ I and Q chips are then summed together using a summation element or adder 128 to generate the desired dot product value $d_k$ which corresponds to the outer spreading code PN with differential coding removed. The decoded PN code chip sequence, $d_k$, is then correlated against different time offsets of a local version of the outer PN code. Because the outer PN spreading code has a longer period on the order of 240 msec., it is important to maximize the probability of detecting the proper alignment within a single outer PN period (288 outer PN chips). Otherwise, a significant amount of time passes and is essentially wasted with respect to performing further signal processing while waiting for the next period to begin.

This suggests that a matched filter approach is useful for implementing the correlation operation. Conceptually, a matched filter is a tapped delay line of W memory elements, that is, a filter length of W. The tap weights are the first W bits of the outer PN and all W of the weighted outputs are summed by an accumulator each time a new outer spreading code PN chip is received and clocked into the filter. The output of the accumulator is then compared to a threshold. A filter output which exceeds the threshold indicates proper alignment with the outer PN spreading code. Using a matched filter, the probability of acquiring the pilot within one or two periods can be very high. Longer filters provide better detection probabilities than shorter ones, but are more costly to implement.

This matched filter approach is shown in FIG. 7, where a matched filter 130 is connected to receive the sequenced $d_k$ values as an input and provide a correlated output to a comparison element or comparator 136. Comparator 136 produces an output indicating when the correlation output from filter 130 exceeds the desired threshold. The output of comparator 136 can be used in conjunction with known detection and acquisition circuitry to select or indicate when selected timing offset values used for the outer PN spreading are appropriate.

The inter-arrival time for the outer PN chips for the example given above is 0.833 msecs., making it feasible to perform the filtering operations of matched filter 130 using a variety of either hardware or software elements known to those skilled in the art. The fact that the tap weights are restricted to the set $\{+1, -1\}$ allows a single serial adder to sum the elements in the filter with the tap weights indicating addition or subtraction. For example, a circular buffer can be used to implement the filter.

Because each outer PN chip is formulated from the sum of 1024 inner PN chips, the outer PN chips benefit from a 30 dB "processing gain" relative to the inner PN chips. This gain implies that the difference between the peak and off-peak maximum ($R_{max}$) of the outer PN autocorrelation function (ACF) is even more important in determining acquisition performance than is the case for the inner PN spreading code. Only a few of the largest off-peak ACF values are large enough to be pushed over the threshold by the addition of noise. Consequently, the main criterion for selecting an outer PN code should be minimization of the maximum off-peak correlation value for an appropriate partial correlation window size (i.e. matched filter length).

Figure 8:
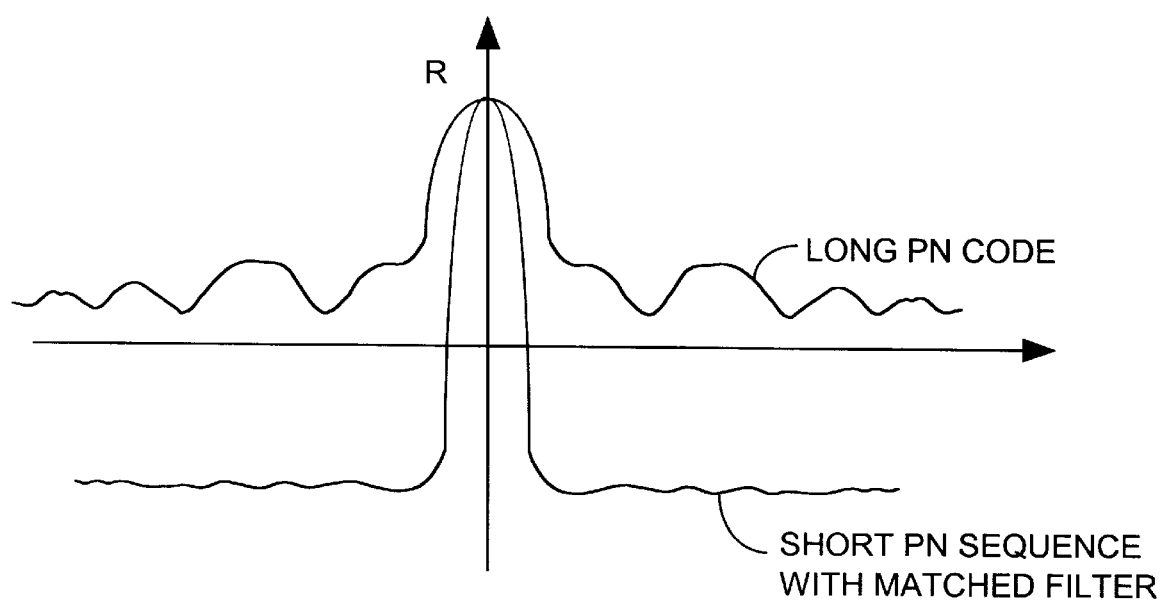
FIG. 8 illustrates a relative difference in integrated energy between a given matched filter and code combination versus using a longer code.

Because the outer code chips last around 1000 times longer (1024) than the inner code chips, a correlation based on 24 outer chips will integrate 1000 times more signal energy than a correlation based on 24 inner chips. Even integrating over an entire longer inner code, say on the order of 2048 chips, would still provide more than ten times the signal energy. An example of the relative impact on the correlation process is shown in FIG. 8. In FIG. 8, a response curve 160 shows an exemplary relative peak and off-peak response when using a longer PN spreading code, while curve 162 shows a response when using a matched filter with the shorter outer PN code. The benefit is readily apparent.

The matched filter detection scheme described above works properly only when the threshold is scaled with respect to an average received outer PN chip energy. A simple but effective method for setting such a threshold is to establish a value that is midway between an average correlation result when aligned, $(1024)^2 W E_c$, and a maximum average result when mis-aligned, $(1024)^2 R_{max} E_c$.

Setting this type of threshold value generally requires that some form of automatic threshold control (ATC) be used to correctly calibrate the threshold. Such an ATC is relatively easy to implement since the magnitude of the dot product output produces an estimate of $(1024)^2 E_c$. These output samples can be routed to a simple filter where they are averaged, to provide some noise immunity, and the resulting average scaled by a factor of $(W+R_{max})/2$ to produce the required threshold.

This approach is illustrated in the lower right side of FIG. 7 where a magnitude formation element 132 is also connected to receive the sequence of dot product values $d_k$. Magnitude formation element 132 generates an output that indicates the relative magnitude of the received input sequence. This magnitude is then provided as an input to a threshold filter 134, which in turn averages the values and scales the resulting average by a factor of $(W+R_{max})/2$ to produce the desired reference threshold. This reference threshold is then provided as an input to comparator 136. In the alternative, magnitude element 132 and threshold filter 134 could be replaced by one or more additional matched filters (not shown) and detection could be made using comparisons between the multiple matched filter outputs, rather than comparing against a threshold. For example, matched filter outputs are collected for a full outer PN period and then the largest output value is selected.

There are several other aspects which should be considered in implementing the invention. First, time and frequency trackers are used by user terminal receivers to track the timing of the inner PN spreading codes. The use of such frequency trackers is discussed in further detail in the signal acquisition patents referenced above. These trackers should be engaged or operating before beginning outer PN acquisition. This keeps signals as coherent as possible over the 1024-length accumulations being used. These trackers are made immune to the outer PN modulation by setting their accumulations to not span beyond or over an outer PN chip boundary. However, such frequency trackers should receive their input directly from the despreader, because pilot filters are not immune to outer PN modulation, as desired.

Second, generation of the local version of the outer PN spreading code is turned off during outer PN acquisition. Once the outer PN timing is resolved, then the local outer PN generator is activated to begin removing the outer code from the received data.

Third, outer PN spreading code acquisition should not begin until the frequency tracker is nearly in steady state operation. If acquisition begins when a tracker is still in a transient mode, the threshold calibration may not be valid because of variations seen in $E_c$ as the frequency error changes. Some method of determining when the threshold value becomes valid is generally needed. Potentially, a measurement from the verification stage can be used to estimate $E_c$, and the corresponding threshold value. Then, outer PN acquisition is not enabled until the actual threshold value reaches 90% of this estimate. Once the dot product values are considered valid, a delay of W outer PN chips is also allowed in order to "load" the matched filter before the detection threshold test is enabled.

While the embodiment of the invention described above represents an advance in the art for signal acquisition, it has been discovered that further improvement can be achieved using particular outer PN spreading code sequences. That is, using certain sequences or types of sequences for constructing the outer PN spreading code further improves performance when employing the technique of the invention. An analysis of the development and use of such sequences is provided below.

Generally, increasing the size of W and selecting an appropriate code produces smaller error probabilities (misses and false alarms). However selecting an appropriate code is important because if the value of $R_{max}$ increases along with increases in W, improvements in communication system performance may be very limited even as the size of W is increased. This can be seen by using an approximation to obtain an estimate of the probability of a miss, which has the form:

$$P_{miss} \approx Q\left(\frac{3}{8}N\frac{E_c}{I_o}\frac{1}{\sqrt{\frac{1}{2}+N\frac{E_c}{I_o}}}\frac{W-R_{max}}{\sqrt{W}}\right).$$

where $I_o$ is an interference signal level associated with receiving the signal of interest.

If the values for $E_c/I_o$ and N, the length of the inner PN code, are fixed, and all of the resulting constant terms are combined into a single constant C, this relationship can be reduced to a simplified form:

$$P_{miss} \approx Q\left(C\left(\frac{W-R_{max}}{\sqrt{W}}\right)\right).$$

Obtaining an accurate estimate of a false alarm probability is more difficult because there are multiple opportunities for a false alarm in each outer PN period, and the statistics at these opportunities vary depending on the corresponding values of the autocorrelation function. However, it is certainly true that the false alarm probability, like the probability of a miss, decreases as a function of $(W-R_{max})/\sqrt{W}$. As a very rough approximation, the false alarm probability can be said to be higher than $P_{miss}$, by as much as an order of magnitude, due to the multiple opportunities for a false alarm. To pin down a false alarm probability more precisely, it is generally best to resort to simulations.

From observing the second relationship above, it can be seen that the best performance is generally achieved by maximizing the difference between W and $R_{max}$, while keeping W as small as possible. Of course keeping W small is also desirable from a hardware perspective.

The best code is selected for use in the invention using selection criterion based on partial signal or code correlation instead of full correlation. An exhaustive search over all $2^{288}$ possible length-288 binary sequences is not performed every time a user terminal wants to acquire a signal, but is done once or more during the design of the communication system to find a suitable code. Such a search would be excessively long and present undesirable communication delays, otherwise. Therefore, a highly useful or efficient, although somewhat less than optimal, approach was developed.

For this technique or approach, a matched filter of length W is first chosen. A code is then generated or constructed from sub-sequences of length W using the structure: [A B B . . . B]. For example, assume W is chosen to have a length of 24 chips (matched filter length of 24), and the total PN code length is 288 chips. Then, both sub-sequences 'A' and 'B' are length 24 and 'B' appears a total of 11 times [i.e., (288 chips–24 chips)/24 chips equals use of 'B' which is 11]. The matched filter is then built using the 'A' sub-sequence so that the receiver is always correlating 'A' against a 24-outer-chip sub-sequence of the full length-288 code. This is a much faster operation than correlating using the entire sequence.

When user terminal receiver timing is properly aligned with the outer PN code, the resulting correlation value is W (24) regardless of the choice of 'A' or 'B'. That is, the correlation value reflects W total received chips for aligned signals, and zero when not aligned. So one goal is to choose values for 'A' and 'B' such that all of the periodic correlations of 'B' with 'A' are minimized, and such that the correlations of A with the transitional regions or portions 'A B' and 'B A' of the repeating PN code are also minimized. Applicants discovered that an effective choice of chip values for the 'B' sub-sequence is to make all chips either +1's or −1's. This approach makes it feasible to perform an exhaustive search for the best 'A' sequence, provided W is not too large, and produces an outer spreading code that is relatively easy to generate.

Application of the search technique described above led to the identification of a very good code matched to a length of twenty-four (W=24), with $R_{max}$ being equal to zero. The identified code produces error probabilities several orders of magnitude smaller (for W=24) than codes developed by other tested techniques, such as truncating m-sequences or pseudo-random searches. At $E_c/I_0$ of −21 dB, a false alarm probability of less than $10^{-4}$ is expected with an even smaller probability for a miss. Consequently, it is believed that using the code discussed below can be viewed as a good tradeoff between obtaining small error probabilities and keeping the matched filter as short as possible.

The first 24 bits of this code, the so-called 'A' portion, are:

[−1 −1 1 1 −1 1 −1 1 1 1 −1 −1 −1 1 −1 1 1 −1 −1 −1 −1 −1 1 −1 1]

with all of the remaining bits, the 'B' portion, being 1's. Mapping 1 to 0 and −1 to 1, the outer PN can be converted to a more compact octal form of:

6 5 4 7 2 3 7 2 0 . . . 0, for storage and retrieval. That is, the +/−1 format is useful for studying correlation and interference, but PN generators are usually based on 0,1 formats and octal codes are commonly used in coding systems.

Figure 9:
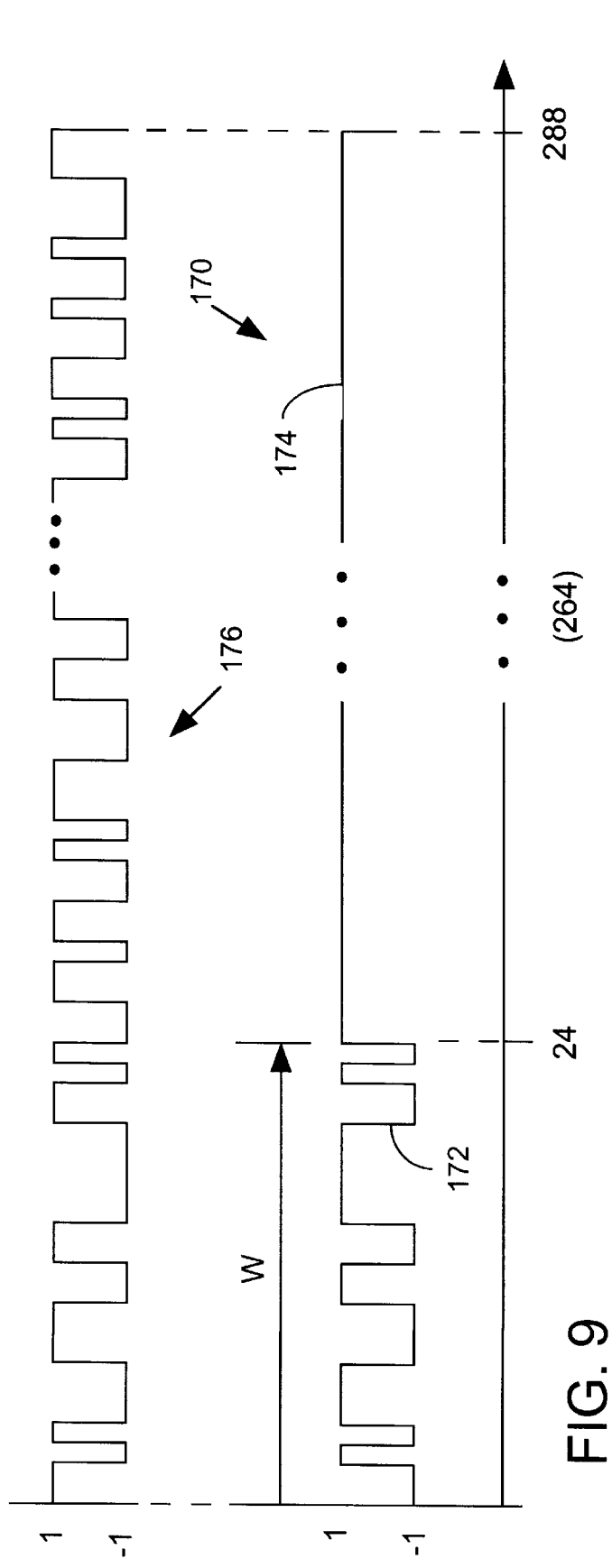
FIG. 9 illustrates exemplary timing relationships for proposed codes.

An example of the timing of such a code over the 288 chip period relative to the filter process is illustrated in FIG. 9. In FIG. 9, a useful outer code 170 is shown having chips with a 24 bit variable portion 172 followed by a 264 chip or bit constant '1' value portion 174. For comparison, a portion of a longer pseudorandom code 176 as might also be useful for implementing the invention, as discussed below, is also shown.

It may be more convenient to store the differentially encoded outer PN code or sequence or sequences within gateway transmitter circuitry, rather than storing an unencoded version and providing a differential encoder in hardware to operate on the data, as shown in FIG. 4. This would reduce hardware by eliminating multiplier 92 and delay element 94 for each of the many channels processed by the gateway. To achieve this reduction, a convention can be adopted for storing differentially encoded sequences in memory or storage elements used in the transmitter wherein they are initialized to 1 in {1, −1} notation or 0 in {0, 1} notation. Using this approach and storing a differentially encoded PN code, the first differentially encoded 24 bits of the sequence from above then become:

[−1 1 1 −1 −1 1 −1 −1 −1 1 −1 1 1 −1 −1 −1 1 −1 1 −1 1 1 1 −1 −1]

with all of the remaining 264 bits or chips being −1's.

Unfortunately, there is a small drawback to storing the differentially encoded version of this outer PN spreading code. After completing differential encoding over one complete period of the outer PN code, the state of the transmitter or differential encoder memory, that is the stored values, is the opposite of what it was at the beginning of the outer PN period. This means that repeatedly encoding the outer PN sequence produces a differential code sequence having a periodicity of 2×288 (chips), and the second half of the sequence is the complement of the first half.

Various approaches can be used to account for this minor complication. First, the unencoded outer PN code can be stored over one period and the differential encoding performed in real time. Second, the total 2×288 bits of the differentially encoded outer PN spreading code can be stored over one outer PN period. Third, somewhere between bits 48 and 264 in the unencoded outer PN code sequence, a single bit can be toggled in value. This simple action preserves $R_{max}$=0 and makes the period of the encoded outer PN equal to 288 bits. Fourth, bit 24 in the unencoded outer PN code can be toggled. This action preserves the string of 264 1's and makes the period of the encoded outer PN spreading code equal to 288 bits. But performance may be sacrificed with this latter technique because $R_{max}$ is now equal to two.

When W is equal to 24, the outer PN code specified above results in $R_{max}$ equal to zero, but $|R|_{max}$ is equal to eight. If for some reason it becomes desirable to use an outer PN code with a small value for $|R|_{max}$, the following code, in octal form:

7 1 3 2 1 0 7 7 7 . . . 7, or

[−1 −1 −1 1 1 −1 1 −1 −1 1 −1 1 1 1 −1 1 1 1 −1 −1 −1 −1 −1 −1 −1 −1 1 1 1 1 . . . 1]

in mapped binary form, provides a value for $|R|_{max}$ equal to four.

A simulation was performed using the above selected PN spreading code and the acquisition circuit of FIG. 7. Even when using pilot signal strengths as low as $E_c/I_0$=−22 dB, the error probabilities were so small that not a single error, either miss or false alarm, occurred in 100,000 simulated trials. That is, the probability that the system incorrectly indicates that the PN spreading code timing is not or is accurate, respectively. An analytic approximation for the ATC method estimated a probability of a miss, where $E_c/I_0$=−22 dB, as being on the order of $3.4 \times 10^{-6}$. When the value for $E_c/I_0$ was further reduced to −25 dB, the analytic approximation for the probability of a miss was about $1 \times 10^{-3}$. Using the ATC method, the corresponding results for 100,000 trials was a probability of about $2.6 \times 10^{-4}$ for a miss and $7 \times 10^{-4}$ for a false alarm. Using the method of picking the biggest value, as referred to previously, resulted in a probability of less than $1 \times 10^{-5}$ for a miss and a less than $1 \times 10^{-5}$ for false alarms for 100,000 trials. That is, no misses or false alarms were seen in the 100,000 trials.

If even smaller error probabilities are desired, one cost effective approach is to require a second-look test. This is easily realized by simply waiting for a period of 288 outer chips after an outer PN code detection has occurred, and repeating the timing determination test. The probability of there being a false alarm on both independent tests of timing is the square of the single-look false alarm probability. For example, using a second look test with the ATC method at $E_c/I_0$=−25 dB changes the false alarm probability from $7 \times 10^{-4}$ to about $4.9 \times 10^{-7}$. The time penalty associated with such a second look is an additional 240 msecs.

The PN code presented above results in an outer PN code consisting of a short random looking segment, 24 chips long, and a long constant segment 264 chips long. An alternative PN code has also been observed that looks pseudorandom over its entire 288 chip length, and may simply be formed as a truncated m-sequence.

This outer code is a sub-sequence cut from a length 511 m-sequence. The characteristic polynomial is:

$Q(z)=1+z^3+z^4+z^6+z^9$

Figure 10:
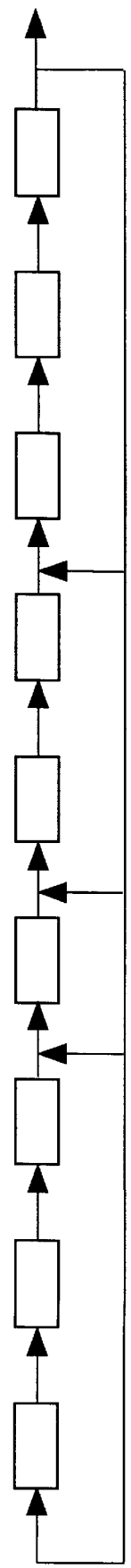
FIG. 10 illustrates an exemplary code generator for use in the acquisition circuit of FIGS. 7 or 11.

An exemplary generator structure for generating such a code is shown in Galois LFSR configuration in FIG. 10. The initial state (register contents) should be [000010010]. The first nine chips of the selected sequence are 010000110, with the leftmost being the first chip. This generator is to be clocked 288 times and then reset to the initial state to provide the desired code sequence. That is, the outer PN sequence repeats every 288 chips or one outer chip period.

This results in a code with maximum off-peak correlation of 12 in a correlation window size of 48. This may give better performance than the previous code which was specifically optimized for a matched filter of length 24. It provides an acceptable level of performance with a single search. The untruncated code can be seen in "Spread Spectrum Communications" Vol. 1, by Simon, et al, in Table 5.8.

However, the matched filter detector method used in the above embodiment may not perform as well with this alternative PN code. Even if the filter length is say doubled to 48 bits, the probability of not detecting correct signal timing $(1-P_{detect})$ is more than an order of magnitude larger for the alternative code, given a fixed false alarm probability. Therefore, another embodiment for the PN code acquisition circuit is presented below. The basic concept consists of collecting a block of outer PN chips from the output of differential decoder elements 124$_A$ 124$_B$ and 128, and then correlating this block against all possible alignments of a local reference for the outer PN spreading code. A signal acquisition architecture for achieving this correlation process is shown in FIG. 11.

Figure 11:
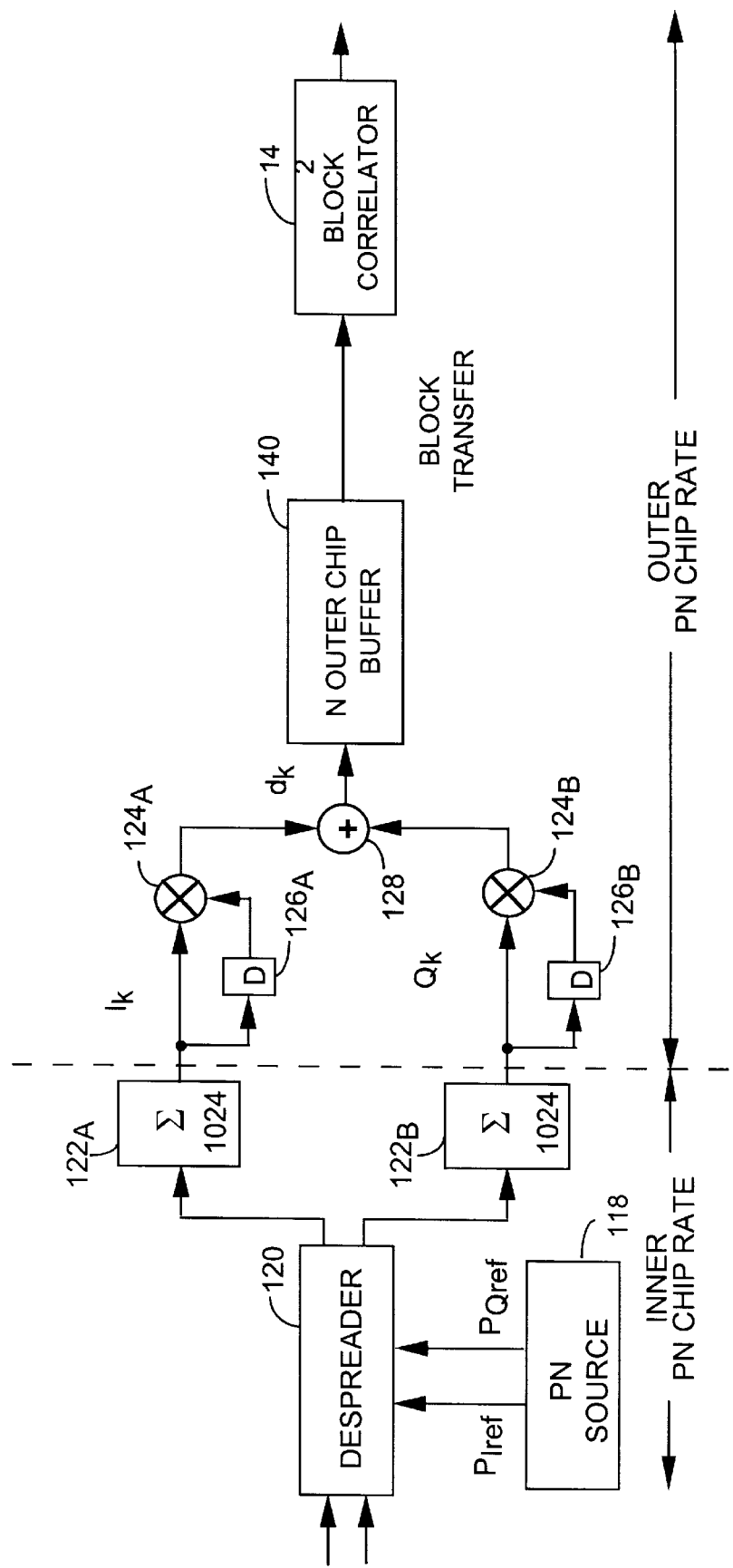
FIG. 11 illustrates an alternative dual layer PN code correlator and signal acquisition circuit.

In FIG. 11, the despreading and differential decoding portions of the signal acquisition apparatus remain unchanged from the configuration shown in FIG. 7. However, matched filter 130 which received outer PN code chips $d_k$, is now replaced by a buffer 140 and a block correlator 142. The actual size of buffer 140 and data blocks used in block correlator 142 are determined according to the specific application and operating parameters of the communication system, as would be known in the art. That is, the complexity of the circuitry and time to process blocks of data, and requirements for acquisition speed and accuracy, determine these sizes.

For purposes of illustration only, a size of 48 chips is used as a representative value in discussing this embodiment. In this example, buffer 140 collects 48 outer PN code chips, or chips over a 48 outer chip period, and then transfers them as a block of data to block correlator 142 for processing. Once data is transferred out of block correlator 142, it begins receiving and buffering the next 48 outer chips.

Figure 12:
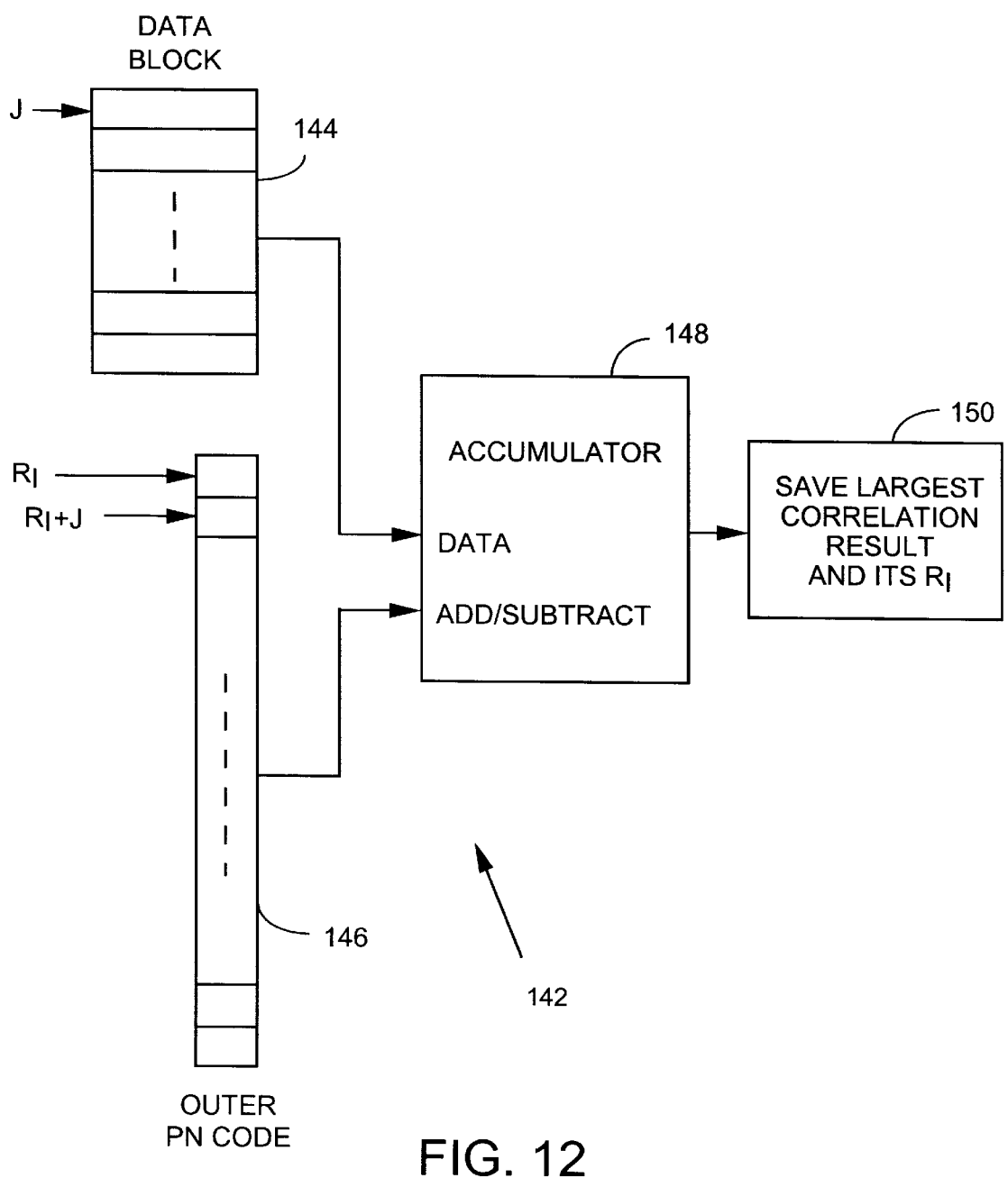
FIG. 12 illustrates an exemplary block correlator for use in the acquisition circuit of FIG. 11.

A more detailed representation of an exemplary block correlator 142 is illustrated in FIG. 12. When a block of decoded outer PN code chips is transferred to correlator 142, the individual chips are stored in consecutive memory locations DATA(0) through DATA(47) in a storage or memory element 144 also referred to as a data block. A local, binary (+/−1 in this model) copy of the outer PN code is stored in a series of consecutive memory locations PN(0) through PN(287) in a memory element 146 also referred to as an outer code block. Each of these blocks has an output line or bus that is connected as an input to an accumulator 148. The output of data block 144 is directed to a data input for accumulator 148 and the output of outer code block 146 is directed to an add/subtract control input for accumulator 148.

The binary values retrieved from PN outer code block 146 are used to control the add/subtract lines of accumulator 148 so that they determine whether or not the current data value being retrieved from data block 144 is added or subtracted with the current accumulator contents. Accumulator 148 computes or generates the correlation of the data with the local PN spreading code at each possible local PN code offset time. Generally, one time offset is tested for each of 288 passes through the data.

The largest correlation value and its corresponding index are saved in another memory location 150, which can form part of accumulator 148. This index value is then reported to controller 110 or other signal acquisition circuitry as a best estimate of the proper outer PN spreading code alignment. A pseudo-code representation of the steps used in this processing is given below. These steps are repeated each time a new block of decoded outer PN code chips is transferred into block correlator 142.

The processing steps undertaken in block correlator 142 are expressed by the pseudocode steps:

Set the values of $R_{max}$ and $R_{max\_i}$ equal to 0
For $R_i=0$ to 287
  R=0
  For j=0 to 47
    R=R+Data(j)*PN(($R_i$+j)mod 288)
  End For
  If R>$R_{max}$
    $R_{max}$=R
    $R_{max\_i}$=$R_i$
  End If
End For This simply processes the data by first setting the values for R, $R_{max}$, and $R_{max\_i}$ equal to 0, where 'i' is an index value for a particular time or phase offset for a code. That is, the number of chips by which the code is offset. Then, for each $R_i$ which runs from 0 to 287, the value of R is determined for each of the 48 data values, that is for j=0 to 47, according to the relationship:

$$R=R+\text{Data}(j)*PN((R_i+j)\bmod 288)$$

Each time R is determined it is compared to $R_{max}$ and if the determined value for R is greater than the currently stored value for $R_{max}$ then $R_{max}$ is set equal to this value for R, and $R_{max\_i}$ is set equal to $R_i$. Therefore, each time R exceeds $R_{max}$ this value of R is chosen as a new value for $R_{max}$ and the $R_i$ value that produced this result is recorded as $R_{max\_i}$. At the end of processing, the value for $R_{max\_i}$ provides the desired timing information.

One drawback to the second proposed PN code versus the first, is that it requires more hardware to utilize, primarily in the form of memory and associated storage and retrieval circuitry. This PN code also demands a higher relative computation rate for buffering and processing blocks of decoded outer chips. At the same time, even when using longer block lengths, detection and false alarm statistics (based on a single block) may or may not be as good as those found for the first proposed PN code. It was anticipated to be roughly equivalent, however, it has been found that the extensibility of the alternative outer PN code, and the chance for repeated looks without waiting a whole outer PN period are worth the added computational complexity. Therefore, a more random outer code can be used instead of the special [A B B . . . B] code. This means that a longer correlation window of W=48 can also be used. It turns out that this is long enough that a relevant table of PN codes could also be found in the literature. One of the codes from the table gives performance equivalent to (or slightly better than) the performance of the special code matched to W=24.

As discussed earlier, to take a second look at the outer PN timing or alignment to verify proper timing acquisition or alignment for the first proposed PN code requires waiting through the 'B' period of the PN code and reloading of the 'A' portion. That is, almost 240 msecs (the outer PN code period) pass until the interesting part of the outer PN code is once again loaded into matched filter 130. With the alternative PN code approach, a second look can be used with the very next block of decoded outer PN code chips. For example, using a block size of 48 decoded chips, the correlation test process or processing (testing each of 288 data passes) can be repeated several times during one outer PN period. The ability to make acquisition decisions based on repeated tests with effectively no waiting period, more than compensates for the added computational complexity generally provided by a single test using the alternative PN code.

Additional advantages of using a more random outer PN code, are that all portions of the alternative outer PN code carry information. This makes the alternative outer PN spreading code more robust in burst error environments because any block of decoded chips can be used. In contrast, only the limited 'A' portion of the first proposed PN spreading code can be used. In addition, a PN spreading code using a long fixed portion is not extensible because it is designed specifically to optimize performance with a length-N, here N=24, matched filter detector. The 'B' portion of that code is not changeable and does not allow improved performance if remaining portions of the acquisition circuitry are also changed, such as increasing memory or correlator block size, and so forth. However, the alternative PN spreading code being more truly pseudorandom over its entire length, makes it more amenable to modifications.

As previously stated, the operations aren't necessarily inner code "first" and outer code "second". The use of "first" and "second" is for purposes of clarity in illustration and convenience in notation in the description. This can be viewed in fact, or in effect, as creating a new longer code with some specially tailored features, which is the product of these two codes. The order of operation for the transmission side (transmitter) or data demodulator can occur either way, that is, by applying these spreading sequences in either order. They can apply the inner code first to the data and then the outer code, or apply the outer code and then the inner code. Alternatively, the operation occurs as a separate combination of the codes which is then used for spreading. However, the searcher receiver is sensitive to which order operations are done in. Here, the inner code gets despread, or is used for despreading, first. That is, it does matter for acquisition purposes in the searcher, where it is inner PN code first and outer PN sequence second.

It should be clear that the acquisition process is a "two step" process, sometimes referred to by the inventors as 'clinching'. In practice the wireless device or telephone first acquires inner code rapidly and later acquires outer code. Using this "two step" approach means that the number of hypotheses have been greatly reduced. This provided an underlying motivation to use this approach in communication systems.

One can think of the acquisition as, starting with no knowledge of inner and outer code timing. A lot of hypotheses of the inner code are tested until it is believed that code timing has been found. There are quite a few hypotheses, and this takes a bit of time. The outer code is totally ignored during this time. At this point, the inner code timing is acquired with 1 chip resolution and 1024 chip ambiguity, for this example, other inner code lengths producing corresponding ambiguity values. Now, it is believed that there is a good hypothesis (a code synchronization match), the receive waveform is input into the outer detector after despreading it with the inner code that has been detected or found. The outer detector determines what the outer offset is, resulting in or providing some additional timing information. This second step achieves timing with 1024 chip resolution (inner code length) and 1024*288 chip ambiguity (inner times outer code lengths). The overall result is that we have timing with 1 chip resolution and 294,912 chip ambiguity.

To re-emphasize what the outer code accomplishes for a communication system, it should be pointed out that the outer code does not implement channelization or separation of users or user signals. When a combination of two PN codes is used on a conventional cellular reverse link, the long code (not the spreading codes) provides channelization. The outer code, here, provides the communication system effectively with a longer time scale than would be available using the inner codes alone. It does this without significantly increasing acquisition time.

This resulting longer time scale provides at least two benefits. First, it provides frame timing without the need for computing lots of error metrics, such as cyclic redundancy checks (CRCs), to test multiple frame-timing hypotheses. Second, it allows unambiguous identification of beams by their outer PN offsets. The inner PN codes are too short (when the desired lengths and periods are used) relative to the variations in path delay to accomplish this.

The impact on acquisition time is minimized because timing can be acquired in two steps. First the n=1024 possible inner code timings are tested, and then the m=288 outer code timings. Therefore, a total of n+m=1312 hypotheses are tested. If the inner code is simply made long enough to resolve the timing ambiguities, one would need to test n*m=294,912 hypothesis. In other words, a two-dimensional grid of timing hypotheses would have to be searched, with 1024 inner offsets on one axis and 288 outer offsets on the other. However, use of the inventive outer PN lets the wireless device search one dimension at a time rather than having to test every cell in the grid.

As a result, by applying the outer PN timing with offsets on the order of 15 msecs., sufficient time is allowed for obtaining beam identification even in the presence of varying path delay. This is useful for the hand-off negotiation that will take place with gateways in a satellite system, and in order to determine the offset of the pilot from system time for soft combining in handoff, and for correctly measuring delta-t's or time and phase differences for position determination. This removes the need to demodulate and process independently every new beam in order to identify a beam.

The use of the outer PN code as a differentially-encoded sequence improves the performance of the telephone or other receiving device during outer PN timing acquisition. The outer PN code can be detected or decoded using a differential scheme, which can operate over a larger range of frequency offsets. Sequences that are spectrally white are preferred in order to minimize the time required for acquisition, but they are not required. Any reasonable pseudorandom binary sequence can be used for the outer code.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. An apparatus for spreading an information signal in a spread spectrum communication system in which digital information signals are bandwidth spread using at least one preselected pseudorandom noise (PN) spreading code to produce spread spectrum signals, comprising:
   means for generating said digital information signals;
   spreading means for receiving and combining at least one first predetermined PN spreading code having a first code length and first code period, a second predetermined PN code sequence having a second code length and second code period, and said digital information signals to provide said spread spectrum signals, said first code length being substantially longer than said second code length and said second code period being substantially longer than said first code period.

2. The apparatus of claim 1 wherein said second PN code is a pre-selected portion of an m-sequence PN code.

3. The apparatus of claim 1 wherein said spreading means comprises:
   first spreading means for receiving and combining at least one first PN code and said digital information signal to produce first spread spectrum signals; and
   second spreading means for receiving and combining said second PN code sequence and said first spread spectrum signals so as to generate second spread spectrum signals.

4. The apparatus of claim 3 further comprising transmission means connected to said second spreading means for receiving and modulating a carrier signal with said second spread spectrum signals.

5. The apparatus of claim 3 wherein said first spreading means comprises:
   a first PN code generator for generating a first spectrum spreading signal of an In-Phase PN chip code using a first polynomial function; and
   a second PN code generator for generating a second spectrum spreading signal of a Quadrature-Phase PN chip code using a second different polynomial function.

6. The apparatus of claim 5 wherein said second spreading means comprises a third PN code generator for generating a third spectrum spreading signal of a third PN chip code which is of a different polynomial function from the first two.

7. The apparatus of claim 6 wherein said second spreading means further comprises:
   storage means for storing a pre-selected PN code sequence;
   delay means connected to receive said stored PN code sequence and impose a one chip delay thereon;
   multiplication means connected to receive and form a product between said PN and delayed PN code sequences, and provide said product as a differentially encoded output.

8. The apparatus of claim 7 wherein said second PN code sequence has a length of 288 chips with the values for the first 24 chips being -1 -1 1 -1 1 1 -1 -1 1 1 -1 -1 -1 1 -1 1 1 -1 -1 -1 -1 -1 1 -1 1 and the remaining chips being 1.

9. The apparatus of claim 1 wherein said spreading means comprises means for generating and combining said second PN code sequence and a one chip a delayed PN code sequence to produce a differentially encoded output.

10. The apparatus of claim 9 wherein said spreading means generates a first order differentially encoded output.

11. The apparatus of claim 9 wherein said spreading means generates a second order differentially encoded output.

12. The apparatus of claim 9 wherein said spreading means generates a coherently differentially encoded output.

13. The apparatus of claim 1 wherein said spreading means comprises:
   delay means connected to receive said second PN code sequence and impose a one chip delay thereon; and
   multiplication means connected to receive and form a product between said second PN and delayed PN code sequences, and provide said product as a differentially encoded output.

14. An apparatus for spreading an information signal in a spread spectrum communication system in which digital information signals are bandwidth spread using at least one preselected pseudorandom noise (PN) spreading code to produce spread spectrum signals, comprising:
   first PN generation means for generating a first PN signal corresponding to at least one first predetermined PN spreading code with a first code length, and a first code period;
   second PN generation means for generating a second PN signal corresponding to a second predetermined PN code sequence with a second code length substantially shorter than that of said first code length and a second code period substantially longer than that of said first code period; and
   spreading means connected to receive and combine said first and second PN signals and said digital information signals for providing said spread spectrum signals.

15. The apparatus of claim 14 wherein said first PN spreading code period is equal to one chip period for said second PN code sequence.

16. The apparatus of claim 15 wherein said first and second PN codes have code periods that commence at the same pre-selected times.

17. The apparatus of claim 14 wherein said first and second PN codes are pre-selected portions of augmented length maximal-length linear sequence PN codes.

18. The apparatus of claim 14 wherein said spreading means comprises data storage means containing a differentially encoded version of said second PN spreading code.

19. A method for spreading an information signal in a spread spectrum communication system in which digital information signals are bandwidth spread using at least one preselected pseudorandom noise (PN) spreading code to produce spread spectrum signals, comprising the steps of receiving and combining at least one first predetermined PN spreading code having a first code length and first code period, a second predetermined PN code sequence having a second code length and second code period, and said digital information signals so as to produce said spread spectrum signals said first code length being substantially longer than said second code length and said second code period being substantially longer than said first code period.

20. The method of claim 19 wherein the step of receiving and combining comprises:
   receiving and combining at least one first PN code and said information signal to produce first spread spectrum signals; and
   receiving and combining said second PN code sequence and said first spread spectrum signals so as to generate said spread spectrum signals.

21. The method of claim 20 wherein the step of generating a first PN code comprises the steps of:
   generating a first spectrum spreading signal of an In-Phase PN chip code using a first polynomial function; and generating a second spectrum spreading signal of a Quadrature-Phase PN chip code using a second different polynomial function.

22. The method of claim 21 wherein the step of generating a second PN code sequence comprises the step of generating a third spectrum spreading signal of a third PN chip code using a different polynomial function from the first two.

23. A method for spreading an information signal in a spread spectrum communication system in which digital information signals are bandwidth spread using a preselected pseudorandom noise (PN) spreading code to produce spread spectrum signals, comprising the steps of:
   generating a first PN signal corresponding to at least one first predetermined PN spreading code having a first code length, and a first code period;
   generating a second PN signal corresponding to a second predetermined PN code sequence with a second code length substantially shorter than that of said first code length and a second code period substantially longer than that of said first code period; and
   receiving and combining said first PN signal, said second PN signal, and said digital information signals so as to generate said spread spectrum signals.

24. The method of claim 23 further comprising the step of setting one chip period for said second PN code substantially equal to said first PN spreading code period.

25. The method of claim 24 further comprising the step of setting code periods for said first and second PN codes to commence at the same pre-selected time.

26. The method of claim 23 further comprising the step of selecting said second PN code from a portion of an m-sequence PN code.

27. The method of claim 23 wherein said step of generating a second PN signal comprises the step of storing a differentially encoded version of the desired second PN code in a data storage means.

28. The method of claim 27 comprising the step of storing a first order differentially encoded-PN code sequence.

29. The method of claim 27 comprising the step of storing a second order differentially encoded PN code sequence.

30. The method of claim 27 comprising the step of storing a coherently differentially encoded PN code sequence.

31. The method of claim 23 wherein said step of generating a second PN signal comprises the steps of:
   storing a pre-selected desired second PN code in a code memory;
   retrieving and generating a one chip delayed version of said stored second PN code;
   retrieving and forming a product between said stored second PN code and delayed version of said stored PN code, to provide a differentially encoded second PN code.

32. The method of claim 31 comprising the step of storing a PN code having a length of 288 chips with the values for the first 24 chips being −1 −1 1 −1 1 1 −1 −1 1 1 −1 −1 −1 1 −1 1 1 −1 −1 −1 −1 −1 1 −1 1 and the remaining chips being 1, as said second PN code.

33. An apparatus for acquiring a communication signal in a spread spectrum communication system in which digital information signals are bandwidth spread using at least a first PN spreading code and a second PN code sequence to produce spread spectrum communication signals, comprising:
   reception means for receiving and demodulating said spread spectrum communication signal to remove a carrier signal to produce a spread spectrum signal as an output;
   despreading means for despreading said spread spectrum signal with said first PN spreading code to generate an intermediate despread signal; and
   means for performing matched filtering of accumulated intermediate despread signals over a period equal to a period of said first PN spreading code.

34. The apparatus of claim 33 further comprising means for comparing results of said filtering to a preselected threshold value.

35. The apparatus of claim 33 wherein:
   said reception means comprises said despreading means for combining said spread spectrum signal with said first PN spreading code to generate said intermediate despread signal; and
   said means for matched filtering comprises accumulation means connected to receive said intermediate despread signal for accumulating said intermediate despread signal over a period equal to said first PN code period.

36. An apparatus for acquiring timing of a spread spectrum communication signal in a spread spectrum communication system in which digital information signals are bandwidth spread using a preselected pseudorandom noise (PN) spreading code to produce spread spectrum modulation signals for transmission to system users, comprising:
   means for receiving a spread spectrum signal comprising a combination of a first PN spreading code of a first code length and period, said digital information signals, and a second PN code sequence of a second code length and a second period substantially longer than the first;
   despreading means for combining said spread spectrum signal with said first PN spreading code to generate an intermediate despread signal;
   accumulation means for accumulating said intermediate despread signal over a period equal to said first PN code period; and
   means for differentially decoding said accumulated intermediate despread signal.

37. The apparatus of claim 36 wherein a differentially encoded version of said second PN code sequence is employed.

38. The apparatus of claim 36 further comprising:
   means for performing matched filtering of said decoded intermediate despread signal; and
   means for comparing results of said filtering to a preselected threshold value.

39. The apparatus of claim 37 further comprising:
   means for determining a magnitude of said decoded intermediate despread signal; and
   means for determining an average value of said magnitude over a period of said first PN spreading code, so as to provide said threshold value.

40. A method for acquiring timing of a spread spectrum communication signal in a spread spectrum communication system in which digital information signals are bandwidth spread using a preselected pseudorandom noise (PN) spreading code to produce spread spectrum modulation signals for transmission to system users, comprising:
   receiving a spread spectrum signal which is combinations of a first PN spreading code of a first code length and period, said digital information signals, and a second PN code of a second code length and a second period substantially longer than the first;
   combining said spread spectrum modulation signal with said first PN spreading code to generate an intermediate despread signal;

accumulating said intermediate despread signal over a period equal to said first PN code period; and differentially decoding said accumulated intermediate despread signal.

41. The method of claim 40 further comprising differentially encoding said second PN code sequence.

42. The method of claim 40 further comprising the steps of:

performing matched filtering of said decoded intermediate despread signal; and comparing results of said filtering to a preselected threshold value.

43. The method of claim 42 further comprising the steps of:

determining a magnitude of said decoded intermediate despread signal; and determining an average value of said magnitude over a period of said first PN spreading code, so as to provide said threshold value.

44. A spread spectrum communication system in which digital information signals are bandwidth spread using a preselected pseudorandom noise (PN) spreading code to produce spread spectrum modulation signals which are transmitted to system users that demodulate said spread spectrum modulation signals to retrieve the information signals, comprising:

a plurality of gateway type base stations each including at least one communication signal transmitter, comprising:

first PN generation means for generating a first PN signal corresponding to a predetermined PN spreading code with a preselected code length, and first period;

first spreading means for receiving and combining said first PN signal and digital information signals and for providing intermediate spread spectrum modulation signals;

second PN generation means for generating a second PN signal corresponding to a second predetermined PN code with a second preselected code length substantially shorter than that of said first PN code and second period substantially longer than that of said first PN code;

second spreading means for receiving and combining said second PN signal and said intermediate spread spectrum modulation signals so as to generate spread spectrum modulation signals;

transmission means connected to said second spreading means for receiving and modulating a carrier signal with said spread spectrum modulation signals to produce a spread spectrum communication signal;

a plurality of user terminals, each including a mobile receiver, comprising:

reception means for receiving and demodulating said spread spectrum communication signal to remove said carrier signal to produce said spread spectrum modulation signal as an output;

despreading means for combining said spread spectrum modulation signals with said first PN spreading code to generate an intermediate despread signals; and accumulation means connected to receive said intermediate despread signal for accumulating said intermediate despread signal over a period equal to said first PN code period;

means for performing matched filtering of said accumulated intermediate despread signal; and means for comparing results of said filtering to a preselected threshold value.

45. The spread spectrum communication system of claim 44 wherein said second spreading means forms a differentially encoded version of a second PN code prior to said combination, and further comprising means for differentially unencoding decoding said accumulated intermediate despread signal.

46. The spread spectrum communication system of claim 44 further comprising a plurality of satellite repeaters configured to receive communication signals from said gateways and transfer said communication signals to user terminals.

47. A spread spectrum communication system in which digital information signals are bandwidth spread using at least one preselected pseudorandom noise (PN) spreading code to produce spread spectrum signals which are transmitted to system users that demodulate said spread spectrum signals to retrieve the information signals, comprising:

spreading means connected to receive and combine at least one predetermined PN spreading code having a preselected first code length and first code period, a second predetermined PN code sequence having a second preselected code length and code period, which is substantially longer than said first PN code period, and said information signals for providing spread spectrum communication signals; and means for receiving spread spectrum communication signals;

despreading means for combining said spread spectrum communication signals with said first PN spreading code to generate an intermediate despread signals;

accumulation means for accumulating said intermediate despread signals over a period equal to said first PN code period; and means for differentially decoding said accumulated intermediate despread signals.

* * * * *